US012657839B2

(12) United States Patent
Kim et al.

(10) Patent No.: US 12,657,839 B2
(45) Date of Patent: Jun. 16, 2026

(54) DEVICE AND METHOD FOR OBTAINING IMAGES IN AUGMENTED REALITY

(71) Applicant: SAMSUNG ELECTRONICS CO., LTD., Suwon-si (KR)

(72) Inventors: Doyoun Kim, Suwon-si (KR); Myongjo Choi, Suwon-si (KR); Bonkon Koo, Suwon-si (KR); Jaeyeol Ryu, Suwon-si (KR); Sunghwan Shin, Suwon-si (KR); Youngmo Jeong, Suwon-si (KR); Jongchul Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 296 days.

(21) Appl. No.: 18/369,505

(22) Filed: Sep. 18, 2023

(65) Prior Publication Data

US 2024/0169679 A1 May 23, 2024

Related U.S. Application Data

(63) Continuation of application No. PCT/KR2023/012838, filed on Aug. 30, 2023.

(30) Foreign Application Priority Data

Nov. 21, 2022 (KR) ........................ 10-2022-0156318

(51) Int. Cl.
*G06T 19/00* (2011.01)
*G06V 10/143* (2022.01)
(Continued)

(52) U.S. Cl.
CPC .......... *G06T 19/006* (2013.01); *G06V 10/143* (2022.01); *G06V 10/25* (2022.01); *G06V 10/60* (2022.01); *G06V 2201/07* (2022.01)

(58) Field of Classification Search
None
See application file for complete search history.

(56) References Cited

U.S. PATENT DOCUMENTS 10,514,541 B2 12/2019 Tantos et al.
10,545,340 B2 1/2020 Ouderkirk et al.
(Continued)

FOREIGN PATENT DOCUMENTS

KR 10-1712350 B1 3/2017
KR 10-2021-0003131 A 1/2021
(Continued)

OTHER PUBLICATIONS

International Search Report (PCT/ISA/210) issued Dec. 5, 2023 by the International Searching Authority in International Patent Application No. PCT/KR2023/012838.
(Continued)

*Primary Examiner* — Yi Wang
(74) *Attorney, Agent, or Firm* — Sughrue Mion, PLLC

(57) ABSTRACT

A device and a method for recommending a custom function in an electronic device to a user is provided. The electronic device obtains a user gesture that repeatedly occur through interaction with the user and determines one or more customized functions to be suggested to the user among a plurality of accessibility functions considering the user gesture. The electronic device may execute a target customized function selected by the user from among the one or more customized functions.

20 Claims, 28 Drawing Sheets

(51) Int. Cl.
  *G06V 10/25* (2022.01)
  *G06V 10/60* (2022.01)

(56) References Cited

U.S. PATENT DOCUMENTS

| | | | | |
|---|---|---|---|---|
| 10,802,600 | B1 * | 10/2020 | Ravasz | G06F 3/013 |
| 10,955,677 | B1 | 3/2021 | Topliss et al. | |
| 10,969,862 | B2 | 4/2021 | Yahav et al. | |
| 11,520,152 | B1 * | 12/2022 | Lau | G02B 27/0172 |
| 11,927,765 | B2 | 3/2024 | Ayres et al. | |
| 11,950,022 | B1 | 4/2024 | Kalinowski et al. | |
| 11,977,229 | B2 | 5/2024 | Xie et al. | |
| 2016/0139411 | A1 * | 5/2016 | Kang | A61B 3/14 |
| | | | | 359/630 |
| 2018/0003980 | A1 * | 1/2018 | Wilson | G02B 27/0093 |
| 2018/0103194 | A1 | 4/2018 | Tang | |
| 2018/0182174 | A1 * | 6/2018 | Choi | G02B 27/0075 |
| 2019/0213745 | A1 | 7/2019 | Yoon et al. | |
| 2021/0055547 | A1 | 2/2021 | Rao et al. | |
| 2021/0055548 | A1 | 2/2021 | Rao et al. | |
| 2021/0063754 | A1 | 3/2021 | Lee et al. | |
| 2021/0070176 | A1 | 3/2021 | Rao et al. | |
| 2021/0132377 | A1 | 5/2021 | Rao et al. | |
| 2021/0199965 | A1 | 7/2021 | Hwang et al. | |
| 2021/0350623 | A1 * | 11/2021 | Robaina | G02B 6/0088 |
| 2022/0079158 | A1 | 3/2022 | Ravishankar et al. | |
| 2022/0244036 | A1 | 8/2022 | Scheller et al. | |

FOREIGN PATENT DOCUMENTS

| | | |
|---|---|---|
| KR | 10-2021-0085286 A | 7/2021 |
| KR | 10-2022-0063467 A | 5/2022 |
| KR | 10-2022-0106023 A | 7/2022 |
| WO | 2018/158921 A1 | 9/2018 |
| WO | 2019/009963 A1 | 1/2019 |

OTHER PUBLICATIONS

Written Opinion (PCT/ISA/237) issued Dec. 5, 2023 by the International Searching Authority in International Patent Application No. PCT/KR2023/012838.
Communication issued Sep. 11, 2025 by the European Patent Office in European Patent Application No. 23894736.0.

* cited by examiner (a)　　　　　　　　　　　　　(b)

(a)                              (b)

(a)            (b)

DEVICE AND METHOD FOR OBTAINING IMAGES IN AUGMENTED REALITY

CROSS-REFERENCE TO RELATED APPLICATIONS

This application is a bypass continuation application, under 35 U.S.C § 111(a), of International Application No. PCT/KR2023/012838 designating the United States, filed on Aug. 30, 2023, in the Korean Intellectual Property Receiving Office, which claims priority from Korean Patent Application No. 10-2022-0156318, filed on Nov. 21, 2022, in the Korean Intellectual Property Office, the disclosures of which are hereby incorporated by reference herein in their entireties.

BACKGROUND

1. Field

The disclosure relates to augmented reality devices, and in particular, to augmented reality devices and methods for obtaining images in augmented reality.

2. Description of Related Art

Recently, immersive technologies that allow a user to experience simulated environment are being developed. The immersive technologies change the way in which users work, live, and enjoy leisure. The immersive technologies may include virtual reality (VR) technology, augmented reality (AR) technology, mixed reality (MR) technology, or extended reality (XR) technology. The XR technology may be a technology encompassing various immersive technologies including VR technology, AR technology, or MR technology.

The AR technology is a technology that synthesizes virtual objects or information with a real environment so that the virtual objects or the information appear like objects present in a real physical environment. Computing and display technologies have enabled the development of systems for AR experiences. In the AR experience, digitally recreated images or parts of the images may be presented to the user as if they were real, or in a way that they may be perceived as real.

In general, AR devices that provide AR experiences to users by applying AR technology are made as wearable devices, such as glasses, head mounted display (HMD) devices, virtual reality headsets (VRH), and AR helmets. Since the AR device developed as a wearable device needs to be worn by the user, weight or volume may be a major factor in determining the convenience of use.

SUMMARY

According to an aspect of the disclosure, there is provided an AR device, including: a lens unit including a reflective surface configured to reflect a light of a first wavelength; a support configured to fix the AR device to a face of the user; a light emitter provided on the support, the light emitter configured to generate first incident light and second incident light; a light receiver provided on an inner surface of the support, the light receiver configured to: obtain first reflected light corresponding to the first incident light from incoming light into the light receiver and output an object image signal based on the first reflected light, and obtain second reflected light corresponding to the second incident light from the incoming light and output an eye image signal based on the second reflected light; and a marker having a reflective surface provided to have a first pattern in an entire area or partial area of at least one of a right eye lens or a left eye lens of the lens unit, wherein the first reflected light corresponds to the first incident light reflected from an object positioned in front of the AR device, passing through the reflective surface, and received at the light receiver, and wherein the second reflected light corresponding to the second incident light reflected from the eye of the user, and subsequently reflected from the reflective surface, and received at the light receiver.

According to an aspect of the disclosure, there is provided a method for performing a multi-modal interaction in an AR device, the method including: emitting first incident light of a first wavelength in front of the AR device; emitting second incident light of a second wavelength different from the first wavelength toward an eye of a user wearing the AR device; receiving reflected light including first reflected light of the first wavelength reflected from an object in front of the AR device, and second reflected light of the second wavelength reflected from the eye; obtaining an object image by separating the first reflected light from the reflected light; obtaining an eye image by separating the second reflected light from the reflected light; and performing an interaction with a user based on the obtained object image or the obtained eye image.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
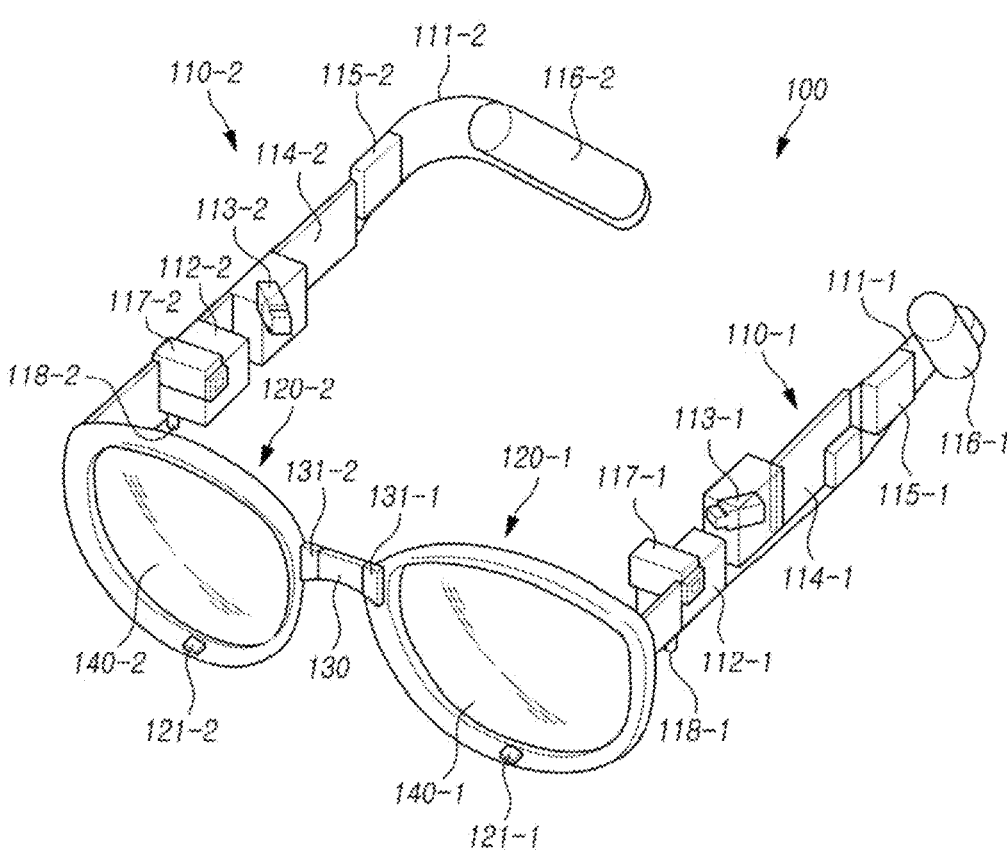
FIG. 1 is a perspective view illustrating a portion of an AR device according to an embodiment of the disclosure.

Embodiments of the disclosure are now described with reference to the accompanying drawings in such a detailed manner as to be easily practiced by one of ordinary skill in the art. However, the disclosure may be implemented in other various forms and is not limited to the embodiments set forth herein. The same or similar reference denotations may be used to refer to the same or similar elements throughout the specification and the drawings. Further, for clarity and brevity, no description is made of well-known functions and configurations in the drawings and relevant descriptions.

According to an embodiment of the disclosure, there is provided a device (e.g., a photoelectronic device) capable of obtaining a front object image and an eye image with at least two optical signals having different wavelengths using a single sensor module and a method for controlling the same.

According to an embodiment of the disclosure, it is possible to reduce the weight or volume of the device and ensure wearing comfort by obtaining an eye image and a front object image by infrared signals having different wavelengths using a single reflective infrared camera module in an AR device.

The technical aspects of the disclosure are not limited to the foregoing, and other technical aspects may be derived by one of ordinary skill in the art from example embodiments of the disclosure.

Advantageous effects of the disclosure are not limited to the foregoing, and other unmentioned effects would be apparent to one of ordinary skill in the art from the following description. In other words, unintended effects in practicing embodiments of the disclosure may also be derived by one of ordinary skill in the art from the embodiments of the disclosure.

In the disclosure, 'AR system' refers to a system that shows a virtual image together in a physical environment space of a real world or shows a real object and a virtual image together.

In the disclosure, 'AR device' may be a device capable of expressing 'augmented reality.' The AR device may include an AR glasses device, shaped like glasses or goggle, worn on the face of the user, and a HMD device, a VRH, and an AR helmet worn on the head of the user.

In the disclosure, 'real scene' may be a real world scene (i.e., the world/surroundings viewed through a naked eye) viewed by the user through an AR device. The real scene may include a real world object. Virtual image is an image generated through an optical engine and may include both a static image and a dynamic image. The virtual image may be observed together with the real scene. The virtual image may be an image representing information about a real-world object in a real scene, information about an operation of an AR device, a control menu, and the like.

According to an embodiment, the AR device may include an optical engine or a waveguide. The optical engine may generate a virtual image based on the light generated by a light source. The waveguide may be formed of a transparent material to guide the virtual image, generated by the optical engine, to the eyes of the user and to show the scenes/surroundings of the real world together. Because the AR device needs to be able to observe scenes/surroundings of the real world as well, an optical element for changing a path of light basically having straightness is required to guide the light generated by the optical engine to the eyes of the user through the waveguide. For example, the optical path may be changed by using reflecting characteristics of a mirror and the like. For example, the optical path may be changed through diffraction characteristics of a diffraction element such as a diffractive optical element (DOE), a holographic optical element (HOE), and the like. However, embodiments of the disclosure are not limited thereto.

FIG. 1 is a perspective view illustrating an AR device 100 according to an embodiment of the disclosure.

Referring to FIG. 1, the AR device 100 may be worn by a user. The AR device 100 may include a glasses-shaped AR glass worn on the face of the user, or a HMD, a VRH, or an AR helmet worn on the head of the user.

The AR device 100 may render or output a display in front of the eyes of the user. The AR device 100 may display visually extended reality content through the display. The visually extended reality content may provide visual information to the user. The AR device 100 may move the screen according to the eye movement of the user (e.g., gaze of the user), thereby providing a real scene or a realistic virtual image.

As an example, the AR device 100 may provide an AR service that outputs at least one virtual object to overlap an area determined as a field of view (FOV) of the user. For example, the area determined as the FOV of the user may be an area determined to be recognized by the user wearing the AR device 100. For example, the area determined as the FOV of the user may be an area including the whole or at least a portion of the display of the AR device 100. The AR device 100 may include a plurality of transparent members respectively corresponding to both eyes of the user.

In an example, the AR device 100 may include a display module 117, a camera 113, and a support 110. The camera 113 may capture an image corresponding to the FOV of the user or measure a distance to an object. The camera 113 may be used for head tracking or space recognition. The camera 113 may recognize the movement of the user. The AR device 100 may also include an audio output unit.

The camera 113 may be used to detect an image corresponding to the FOV of the user, that is, a movement of an object, or to recognize a space. The camera 113 may be used to detect the pupil of the user. The camera 113 may be used to track the pupil of the user. The camera 113 may be used to adjust the center of the virtual image projected onto the AR device 100 to be positioned according to the gaze direction of the pupil of the user wearing the AR device 100. For example, the camera 113 may be a global shutter (GS) camera. The GS camera may detect the pupil and track the fast pupil movement without delay. The camera 113 may include a left camera 113-1 and/or a right camera 113-2.

In an example, the display module 117 may include a left lens unit 140-1 and/or a right lens unit 140-2. The virtual object output through the display module 117 may include information related to an application program executed on the AR device 100. Further, the virtual object outputted through the display module 117 may include information related to the actual object located in the space/area corresponding to the area determined as the FOV of the user. For example, the AR device 100 may identify an external object included in at least a portion of the image information related to the actual space obtained through the camera 113 corresponding to the area determined as the FOV of the user.

The AR device 100 may output the virtual object related to the external object identified in at least a portion through the area determined as the FOV of the user in the display area of the AR device 100. The external object may include an object present in the actual space (e.g., real scene).

In an example, the lens unit 140 may include a condensing lens, a vision correction lens, or a waveguide in the transparent member. For example, the transparent member may be formed of a glass plate, a plastic plate, or a polymer. The transparent member may be manufactured to be completely transparent or translucent. The transparent member may include a right lens unit 140-2 facing the right eye of the user wearing the AR device 100. The transparent member may include a left lens unit 140-1 facing the left eye of the user wearing the AR device 100. When the display is transparent, a screen may be provided at a position facing the eyes of the user.

The waveguide may transfer light generated from the light source of the display to the eyes of the user. For example, the waveguide may be at least partially positioned in a portion of the lens unit 140.

For example, the lens unit 140 may include a display panel or a lens (e.g., glass). For example, the display panel may be formed of a transparent material such as glass or plastic. The lens unit 140 may be formed of a transparent element. The user may notice, by looking through the lens unit 140, the actual space on the rear surface of the lens unit 140. The lens unit 140 may display the virtual object in at least a partial area of the transparent device so that the virtual object is shown to the user as if it is added to at least a portion of the actual space.

According to an embodiment, the support 110 (or 110-1, 110-2) may include printed circuit boards (PCBs) 114-1 and 114-2 for transferring an electrical signal to each component of the AR device 100. The support 110 may include speakers 115-1 and 115-2 for outputting an audio signal. The support 110 may include batteries 116-1 and 116-2 for supplying power. For example, in the glasses-type AR device 100, the support 110-1, 110-2 may be provided on the temple 111-1,

111-2. The support 110 may include a hinge part for coupling to a rim 120-1. 120-2 of the AR device 100.

The speakers 115-1 and 115-2 may include a left speaker 115-1 for transferring an audio signal to the left ear of the user. The speakers 115-1 and 115-2 may include a right speaker 115-2 for transferring an audio signal to the right ear of the user.

The AR device 100 may include a microphone 121 for receiving voice of the user and ambient sound. The AR device 100 may include at least one light emitter (e.g., an illumination LED) 112 to increase the accuracy of the at least one camera 113 (e.g., an ET (eye tracking) camera, an outward camera, or a recognition camera). For example, the light emitter 112 may be used as an auxiliary device for increasing accuracy when photographing the pupil of the user with the camera 113. The light emitter 112 may use an IR LED having an infrared wavelength rather than a visible light wavelength. For example, the light emitter 112 may be used as an auxiliary device when it is not easy to detect a subject due to low lighting when capturing or photographing a gesture of the user with the camera 113.

Figure 2A:
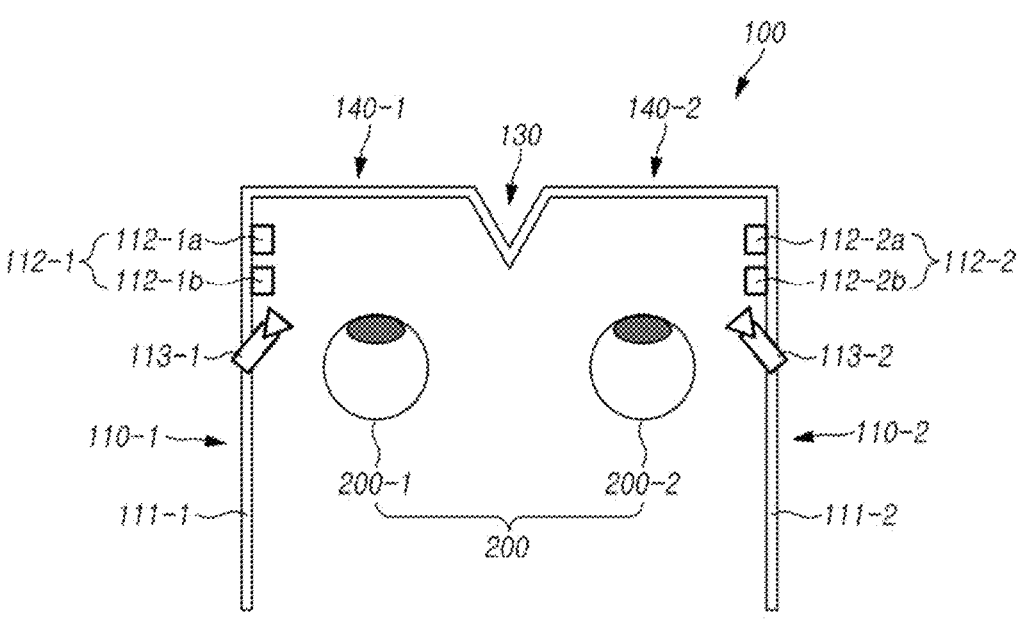
FIG. 2A is a view illustrating an example in which a light emitter and a light receiver constituting a sensor module are provided in an AR device according to an embodiment.

FIG. 2A is a view illustrating an example in which a light emitter (e.g., the left light emitter 112-1 and the right light emitter 112-2 of FIG. 1) and a light receiver (e.g., the left light receiver 113-1 and the right light receiver 113-2 of FIG. 1) constituting a sensor module (or a photoelectronic device) are provided in an AR device (e.g., the AR device 100 of FIG. 1) according to an embodiment.

Referring to FIG. 2A, the AR device 100 may include a support (e.g., the support 110 of FIG. 1), a rim (e.g., the rim 120 of FIG. 1), a bridge (e.g., the bridge 130 of FIG. 1), or a lens unit (e.g., the lens unit 140 of FIG. 1). The support 110 may include a left support (e.g., the left support 110-1 of FIG. 1) or a right support (e.g., the right support 110-2 of FIG. 1). The rim 120 may include a left rim (e.g., the left rim 120-1 of FIG. 1) or a right rim (e.g., the right rim 120-2 of FIG. 1). The lens unit 140 may include a left lens unit (e.g., the left lens unit 140-1 of FIG. 1) or a right lens unit (e.g., the right lens unit 140-2 of FIG. 1). The left lens unit 140-1 may be attached to the left rim 120-1. For example, the left lens unit 140-1 may be fitted and fixed to the left rim 120-1. The right lens unit 140-2 may be attached to the right rim 120-2. For example, the right lens unit 140-2 may be fitted and fixed to the right rim 120-2. The bridge 130 may connect the left rim 120-1 and the right rim 120-2. For example, when the user wears the AR device 100, the bridge 130 may be hung and fixed over the nose of the user.

According to an embodiment, the support 110 may include a temple 111. The temple 111 may be provided with a sensor module near where the temple 111 is connected the rim 120. The sensor module may include a light emitter (e.g., the light emitter 112 of FIG. 1). The light emitter 112 may generate at least two optical signals (e.g., IR signals) having different wavelengths (e.g., 850 nm and 940 nm) and output them as incident light. The sensor module may include a light receiver (e.g., the light receiver 113 of FIG. 1). The light receiver 113 may receive an optical signal which is the reflection, by the target object, of the incident light output by the light emitter 112. The light receiver 113 may be classified into at least two reflected waves (e.g., IR signals) having different wavelengths (e.g., 850 nm and 940 nm) from the received optical signal. The light receiver 113 may convert and output each of the classified reflected waves into an electrical signal. The target object may include a front object (e.g., the front object 150 of FIG. 2C or 2E). The target object may include the eye 200 of the user (e.g., left eye 200-1 and right eye 200-2). The front object 150 may be one hand or both hands of the user. However, the disclosure is not limited thereto, and as such, according to another embodiment, the front object may be any object in front of the AR device 100. The light receiver 113 may include a wavelength separator (e.g., the wavelength separator 400 of FIG. 4A or 4B). The wavelength separator 400 may receive the optical signal reflected from the target object and separate the received optical signal into at least two reflected waves (e.g., IR signals) having different wavelengths (e.g., 850 nm and 940 nm).

According to an embodiment, the left support 110-1 included in the support 110 may include a left light emitter (e.g., the left light emitter 112-1 of FIG. 1) or a left light receiver (e.g., the left light receiver 113-1 of FIG. 1) attached to an inner surface of the left temple 111-1. The left light emitter 112-1 or the left light receiver 113-1 may be provided, e.g., near where the left temple 111-1 is connected to the left rim 120-1.

The left light emitter 112-1 may transmit at least two optical signals having different wavelengths (e.g., 850 nm and 940 nm), for example may be infrared (IR) rays) (hereinafter, referred to as "left incident light" or "left incident IR"). toward the left lens unit 140-1 attached to the left rim 120-1. At least one optical signal (e.g., IR having a wavelength of 850 nm) (hereinafter, referred to as "first left incident light" or "first left incident IR") included in the at least two optical signals may be transmitted through a reflective surface (e.g., the reflective surface 143-1 of FIG. 2B or 3B) of the left lens unit 140-1 to the front object (e.g., the hand of the user). At least one optical signal (e.g., IR having a wavelength of 940 nm) (hereinafter, referred to as "second left incident light" or "second left incident IR") included in the at least two optical signals may not pass through the reflective surface 143-1 of the left lens unit 140-1 but may be reflected and transferred to the left eye 200-1 of the user. According to an embodiment, the term "transferred to the left eye 200-1 of the user" may mean that the least one optical signal (e.g., IR) is outputted onto left eye of the user.

As an example, the left light emitter 112-1 may include at least one first left light emitting element 112-1a. The at least one first left light emitting element 112-1a may be externally controlled to generate first left incident light (e.g., first left incident IR having a wavelength of 850 nm). The first left incident light generated by the at least one first left light emitting element 112-1a may pass through the reflective surface 143-1 of the left lens unit 140-1 and may be transferred to the front object (e.g., the hand of the user). According to an embodiment, the term "transferred to the front object" may mean that the first left incident light is outputted onto the front object.

As an example, the left light emitter 112-1 may include at least one second left light emitting element 112-1b. The at least one second left light emitting element 112-1b may be externally controlled to generate second left incident light (e.g., second left incident IR having a wavelength of 940 nm). The second left incident light generated by the at least one second left light emitting element 112-1b may not pass through the reflective surface 143-1 of the left lens unit 140-1 but may be reflected and transferred to the left eye 200-1 of the user.

The left light receiver 113-1 may receive at least two optical signals (e.g., IR rays) having different wavelengths (e.g., 850 nm and 940 nm) from the left lens unit 140-1 attached to the left rim 120-1 (hereinafter, referred to as "left reflected light" or "left reflected IR"). At least one optical signal (e.g., IR having a wavelength of 850 nm) (hereinafter, referred to as "first left reflected light" or "first left reflected IR") included in the at least two optical signals may pass through the reflective surface 143-1 and the lens (e.g., the lens 141-1 of FIG. 2B or 3B) of the left lens unit 140-1 and reach the front object (e.g., the hand of the user). At least one optical signal reaching the front object may be reflected from the front object and transmitted through the reflective surface 143-1 and the lens 141-1 of the left lens unit 140-1 and be received by the left light receiver 113-1. At least one optical signal (e.g., IR having a wavelength of 940 nm) (hereinafter, referred to as "second left reflected light" or "second left reflected IR") included in the at least two optical signals may not pass through the reflective surface 143-1 of the left lens unit 140-1 but may be reflected to the left eye 200-1 of the user and then reflected from the left eye 200-1. The optical signal reflected from the left eye 200-1 may be reflected from the reflective surface 143-1 of the left lens unit 140-1 and received by the left light receiver 113-1.

According to an embodiment, the right support 110-2 included in the support 110 may include a right light emitter (e.g., the left light emitter 112-2 of FIG. 1) or a right light receiver (e.g., the left light receiver 113-2 of FIG. 1) attached to an inner surface of the right temple 111-2. The right light emitter 112-2 or the right light receiver 113-2 may be provided, e.g., near where the right temple 111-2 is connected to the right rim 120-2.

The right light emitter 112-2 may transmit at least two optical signals (e.g., IR rays) having different wavelengths (e.g., 850 nm and 940 nm) (hereinafter, referred to as "right incident light" or "right incident IR") toward the right lens unit 140-2 attached to the right rim 120-2. At least one optical signal (e.g., IR having a wavelength of 850 nm) (hereinafter, referred to as "first right incident light" or "first right incident IR") included in the at least two optical signals may be transmitted through the reflective surface 143-1 and the lens 141-1 of the right lens unit 140-2 to the front object (e.g., the hand of the user). At least one optical signal (e.g., IR having a wavelength of 940 nm) (hereinafter, referred to as "second right incident light" or "second right incident IR") included in the at least two optical signals may not pass through the reflective surface 143-1 of the right lens unit 140-2 but may be reflected and transferred to the right eye 200-2 of the user.

As an example, the right light emitter 112-2 may include at least one first right light emitting element 112-2a. The at least one first right light emitting element 112-2a may be externally controlled to generate first right incident light (e.g., first right incident IR having a wavelength of 850 nm). The first right incident light generated by the at least one first right light emitting element 112-2a may pass through the reflective surface 143-1 of the right lens unit 140-2 and may be transferred to the front object (e.g., the hand of the user).

As an example, the right light emitter 112-2 may include at least one second right light emitting element 112-2b. The at least one second right light emitting element 112-2b may be externally controlled to generate second right incident light (e.g., second right incident IR having a wavelength of 940 nm). The second right incident light generated by the at least one second right light emitting element 112-2b may not pass through the reflective surface 143-1 of the right lens unit 140-1 but may be reflected and transferred to the right eye 200-2 of the user.

The right light receiver 113-2 may receive at least two optical signals (e.g., IR rays) having different wavelengths (e.g., 850 nm and 940 nm) from the right lens unit 140-2 attached to the right rim 120-2 (hereinafter, referred to as "right reflected light" or "right reflected IR"). At least one optical signal (e.g., IR having a wavelength of 850 nm) (hereinafter, referred to as "first right reflected light" or "first right reflected IR") included in the at least two optical signals may pass through the reflective surface and the lens of the right lens unit 140-2 and reach the front object (e.g., the hand of the user). The optical signal reaching the front object may be reflected from the front object and transmitted through the reflective surface and the lens of the right lens unit 140-2 and be received by the right light receiver 113-2. At least one optical signal (e.g., IR having a wavelength of 940 nm) (hereinafter, referred to as "second right reflected light" or "second right reflected IR") included in the at least two optical signals may not pass through the reflective surface of the right lens unit 140-2 but may be reflected to the right eye 200-2 of the user and then reflected from the right eye 200-2. The optical signal reflected from the right eye 200-2 may be reflected from the reflective surface of the right lens unit 140-2 and received by the right light receiver 113-2.

In the following description, 'incident light' may refer to one of 'left incident light' or 'right incident light' or may be used to collectively refer to 'left incident light' and 'right incident light.' In the following description, 'reflective light' may refer to one of 'left reflected light' or 'right reflected light' or may be used to collectively refer to 'left reflected light' and 'right reflected light.'

Figure 2B:
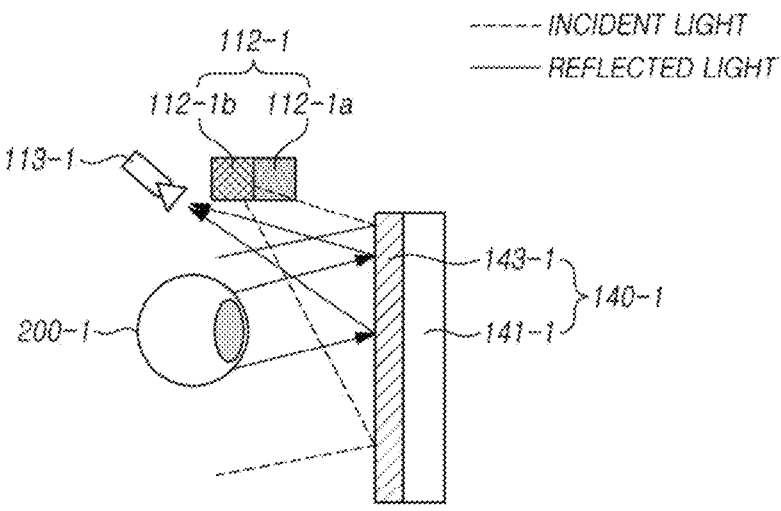
FIGS. 2B and 2C are views illustrating an example configuration of a lens unit in an AR device according to an embodiment.
Figure 2C:
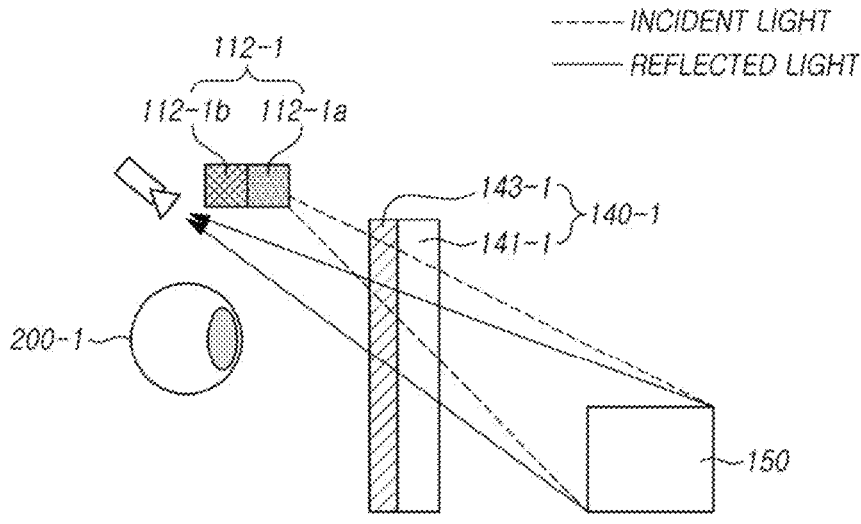

FIGS. 2B and 2C are views illustrating an example of a configuration of a lens unit (e.g., the left eye lens unit 140-1 of FIG. 2A) in an AR device (e.g., the AR device 100 of FIG. 1) according to an embodiment. Although the left eye lens unit 140-1 of FIG. 2A is illustrated, the disclosure is not limited thereto, and as such, the right eye lens unit 140-2 of FIG. 2A may be implemented in a similar manner.

Referring to FIGS. 2B and 2C, the lens unit 140-1 may include a reflective surface 143-1 provided on an inner surface of the lens 141-1. The reflective surface 143-1 may be a layer formed to have a predetermined thickness by applying a material that transmits a first wavelength (e.g., 850 nm) through an inner surface of the lens 141-1 and reflects a second wavelength (e.g., 940 nm). Although the first wavelength is 850 nm and the second wavelength is 940 nm according to an embodiment, the disclosure is not limited thereto, and as such, according to another embodiment, the first wavelength and the second wavelength may have different values than 850 nm and 940 nm.

According to an embodiment, the light emitter (e.g., the left light emitter 112-1 of FIG. 2A) may include a first light emitting element (e.g., the first left light emitting element 112-1a of FIG. 2A). The first light emitting element 112-1a may be externally controlled to generate first incident light (e.g., first left incident light having a wavelength of 850 nm) (denoted by the dashed line). The first incident light generated by the first light emitting element 112-1a may be transmitted through the reflective surface 143-1 and the lens 141-1 of the lens unit 140-1 to the front object 150 (e.g., the hand of the user) (see FIG. 2C).

According to an embodiment, the light emitter (e.g., the left light emitter 112-1 of FIG. 2A) may include a second light emitting element (e.g., the second left light emitting element 112-1b of FIG. 2A). The second light emitting element 112-1b may be externally controlled to generate second incident light (e.g., second left incident light having a wavelength of 940 nm) (denoted by the dashed line). The second incident light generated by the second light emitting element 112-1b may not pass through the reflective surface 143-1 of the lens unit 140-1 but may be reflected and transferred to the left eye 200-1 of the user (see FIG. 2B).

According to an embodiment, the light receiver (e.g., the left light receiver 113-1 of FIG. 2A) may receive first reflected light (e.g., the first left reflected light having a wavelength of 850 nm) (denoted by the solid line) reflected from the front object 150 (e.g., the hand of the user) and then returned through the lens 141-1 and the reflective surface 143-1 (see FIG. 2C). The first incident light generated by the first light emitting element 112-1a may be transmitted to the front object 150 (e.g., the hand of the user) through the reflective surface 143-1 and the lens 141-1. That is, since the reflective surface 143-1 is configured to transmit light with a first wavelength (e.g., 850 nm), the first incident light generated by the first light emitting element 112-1a may be transmitted to the front object 150.

According to an embodiment, the light receiver (e.g., the left light receiver 113-1 of FIG. 2A) may receive the reflected second reflected light (e.g., the second left reflected light having a wavelength of 940 nm) (denoted by the solid line) without passing through the reflective surface 143-1 after being reflected from the left eye 200-1 of the user (see FIG. 2B). The second incident light generated by the second light emitting element 112-1b may not pass through the reflective surface 143-1 but may be reflected and transferred to the left eye 200-1. That is, since the reflective surface 143-1 is configured to reflect light with a second wavelength (e.g., 940 nm), the second incident light generated by the second light emitting element 112-1b is reflected by the reflective surface 143-1.

Figure 2D:
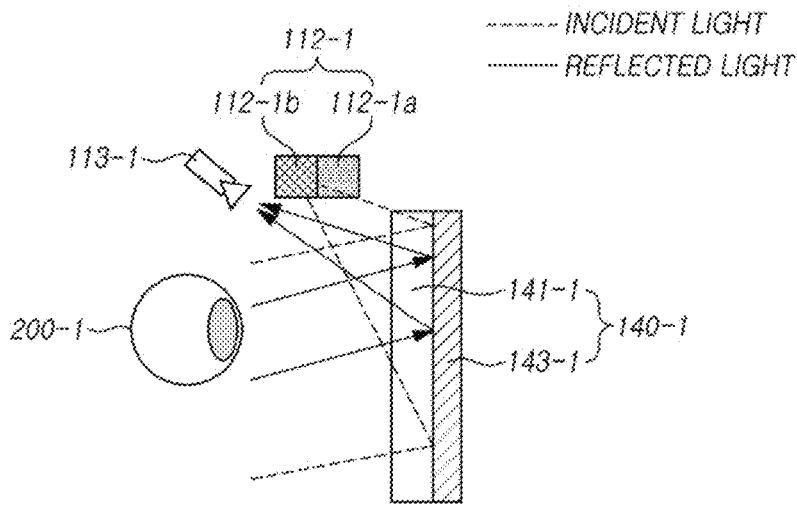
FIGS. 2D and 2E are views illustrating an example configuration of a lens unit in an AR device according to an embodiment.
Figure 2E:
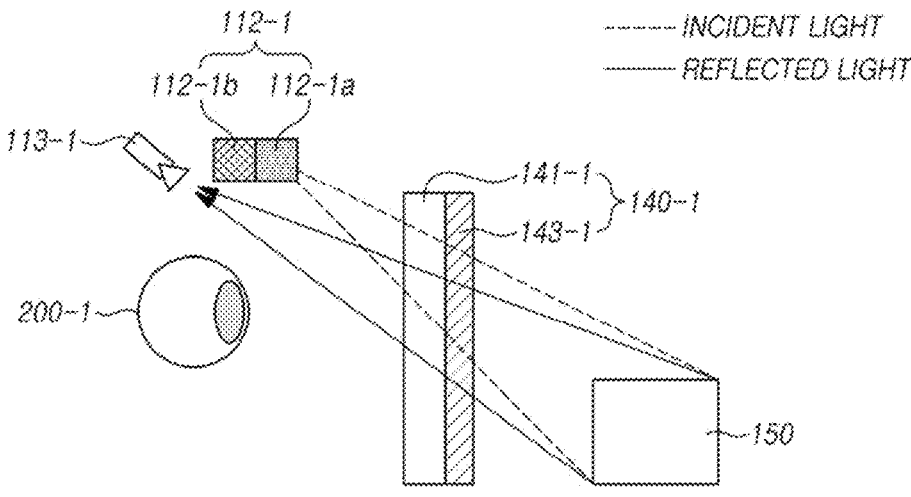

FIGS. 2D and 2E are views illustrating an example of a configuration of a lens unit (e.g., the left eye lens unit 140-1 of FIG. 1) in an AR device (e.g., the AR device 100 of FIG. 1) according to an embodiment.

Referring to FIGS. 2D and 2E, the lens unit 140-1 may provide a reflective surface 143-1 on an outer surface of the lens 141-1. The reflective surface 143-1 may be a layer formed to have a predetermined thickness by applying a material that transmits a first wavelength (e.g., 850 nm) through an outer surface of the lens 141-1 and reflects a second wavelength (e.g., 940 nm).

According to an embodiment, the light emitter (e.g., the left light emitter 112-1 of FIG. 2A) may include a first light emitting element (e.g., the first left light emitting element 112-1a of FIG. 2A). The first light emitting element 112-1a may be externally controlled to generate first incident light (e.g., first left incident light having a wavelength of 850 nm) (denoted by the dashed line). The first incident light generated by the first light emitting element 112-1a may be transmitted through the lens 141-1 and reflective surface 143-1 of the lens unit 140-1 to the front object 150 (e.g., the hand of the user) (see FIG. 2E).

According to an embodiment, the light emitter (e.g., the left light emitter 112-1 of FIG. 2A) may include a second light emitting element (e.g., the second left light emitting element 112-1b of FIG. 2A). The second light emitting element 112-1b may be externally controlled to generate second incident light (e.g., second left incident light having a wavelength of 940 nm) (denoted by the dashed line). The second incident light generated by the second light emitting element 112-1b may pass through the lens 141-1 of the lens unit 140-1 but may not pass through the reflective surface 143-1 but may be reflected and transferred to the left eye 200-1 of the user (see FIG. 2D).

According to an embodiment, the light receiver (e.g., the left light receiver 113-1 of FIG. 2A) may receive first reflected light (e.g., the first left reflected light having a wavelength of 850 nm) (denoted by the solid line) reflected from the front object 150 (e.g., the hand of the user) and then returned through the reflective surface 143-1 and lens 141-1 (see FIG. 2E). The first incident light generated by the first light emitting element 112-1$a$ may be transmitted to the front object 150 (e.g., the hand of the user) through the lens 141-1 and the reflective surface 143-1.

According to an embodiment, the light receiver (e.g., the left light receiver 113-1 of FIG. 2A) may receive the reflected second reflected light (e.g., the second left reflected light having a wavelength of 940 nm) (denoted by the solid line) transmitted through the lens 141-1, but not through the reflective surface 143-1, after being reflected from the left eye of the user 200-1 (see FIG. 2D). The second incident light generated by the second light emitting element 112-1$b$ may not pass through the reflective surface 143-1 but may be reflected and transferred to the left eye 200-1.

Figure 3A:
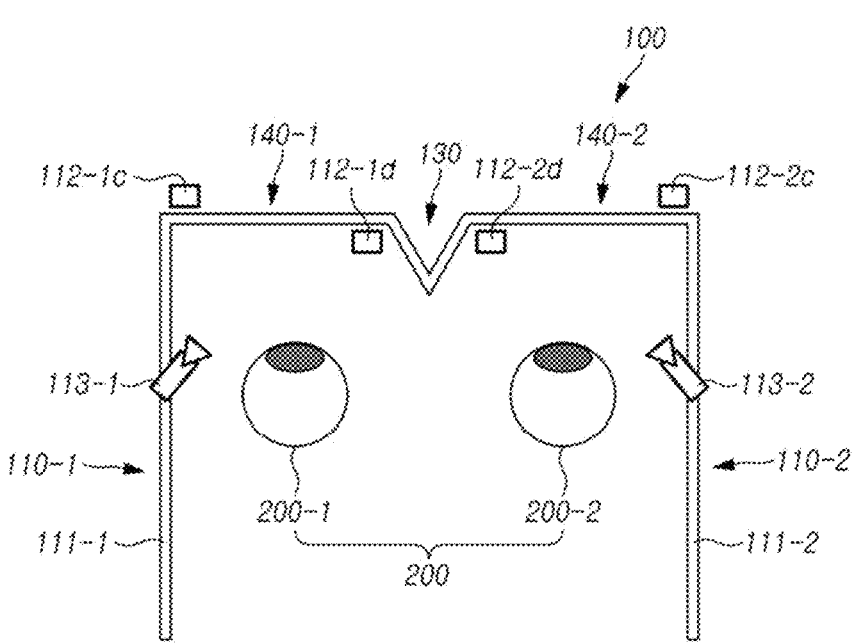
FIG. 3A is a view illustrating an example in which a light emitter and a light receiver constituting a sensor module are provided in an AR device according to an embodiment.

FIG. 3A is a view illustrating an example in which a light emitter (e.g., the left light emitter 112-1 and the right light emitter 112-2 of FIG. 1) and a light receiver (e.g., the left light receiver 113-1 and the right light receiver 113-2 of FIG. 1) constituting a sensor module are provided in an AR device (e.g., the AR device 100 of FIG. 1) according to an embodiment.

Referring to FIG. 3A, the AR device 100 may include a support (e.g., the support 110 of FIG. 1), a rim (e.g., the rim 120 of FIG. 1), a bridge (e.g., the bridge 130 of FIG. 1), or a lens unit (e.g., the lens unit 140 of FIG. 1). The support 110 may include a left support (e.g., the left support 110-1 of FIG. 1) and/or a right support (e.g., the right support 110-2 of FIG. 1). The rim 120 may include a left rim (e.g., the left rim 120-1 of FIG. 1) and/or a right rim (e.g., the right rim 120-2 of FIG. 1). The lens unit 140 may include a left lens unit (e.g., the left lens unit 140-1 of FIG. 1) and/or a right lens unit (e.g., the right lens unit 140-2 of FIG. 1). The left lens unit 140-1 may be attached to the left rim 120-1. For example, the left lens unit 140-1 may be fitted and fixed to the left rim 120-1. The right lens unit 140-2 may be attached to the right rim 120-2. For example, the right lens unit 140-2 may be fitted and fixed to the right rim 120-2. The bridge 130 may connect the left rim 120-1 and the right rim 120-2. For example, when the user wears the AR device 100, the bridge 130 may be hung and fixed over the nose of the user.

According to an embodiment, the support 110 may include a temple 111. The temple 111 may have a light emitter (e.g., the light emitter 112 of FIG. 1) constituting the sensor module near where it is connected to one side of the rim 120. The rim 120 may have a light receiver (e.g., the light receiver 113 of FIG. 1) constituting the sensor module near where the rim 120 is connected to one side of the temple 111. The light emitter 112 may generate at least two optical signals (e.g., IR signals) having different wavelengths (e.g., 850 nm and 940 nm) and output them as incident light. The light receiver 113 may receive the optical signal of the incident light output by the light emitter 112 and reflected from the target object and separate the received optical signal into at least two reflected waves (e.g., IR signals) having different wavelengths (e.g., 850 nm and 940 nm). The light receiver 113 may convert each of the classified reflected waves into an electrical signal and output the electrical signal. The target object may include a front object (e.g., the front object 150 of FIG. 3C or 3E) or an eye 200 of the user (e.g., the left eye 200-1 and the right eye 200-2). The front object 150 may be one hand or both hands of the user. The light receiver 113 may include a wavelength separator (e.g., the wavelength separator 400 of FIG. 4A or 4B). The wavelength separator 400 may receive the optical signal reflected from the target object and separate the received optical signal into at least two reflected waves (e.g., IR signals) having different wavelengths (e.g., 850 nm and 940 nm).

According to an embodiment, a left light emitter (e.g., the left light emitter 112-1 of FIG. 1) may be provided on the left rim 120-1. The left light emitter 112-1 may include at least one third left light emitting element 112-1$c$ and at least one fourth left light emitting element 112-1$d$. The at least one third left light emitting element 112-1$c$ may be provided on an outer side (front of the left rim 120-1) near where the left rim 120-1 is connected to the left temple 111-1. The at least one fourth left light emitting element 112-1$d$ may be provided at an inner side (rear of the left rim 120-1) near where the left rim 120-1 is connected to the bridge 130.

For example, the at least one third left light emitting element 112-1$c$ may be externally controlled to generate a third left incident light (e.g., IR having a wavelength of 850 nm) (hereinafter, referred to as "third left incident light" or "third left incident IR"). The third left incident light generated by the at least one third left light emitting element 112-1$c$ may be transferred to the front object (e.g., the hand of the user). The at least one fourth left light emitting element 112-1$d$ may be externally controlled to generate a fourth left incident light (e.g., infrared ray having a wavelength of 940 nm) (hereinafter, referred to as "fourth left incident light" or "fourth left incident IR"). The fourth left incident light generated by the at least one fourth left light emitting element 112-1$d$ may be transferred to the left eye 200-1 of the user.

According to an embodiment, the left support 110-1 included in the support 110 may include a left light receiver (e.g., the left light receiver 113-1 of FIG. 1) attached to an inner surface of the left temple 111-1. The left light receiver 113-1 may be provided, e.g., near where the left temple 111-1 is connected to the left rim 120-1.

The left light receiver 113-1 may receive at least two optical signals (e.g., infrared (IR) rays) having different wavelengths (e.g., 850 nm and 940 nm) from the left lens unit 140-1 attached to the left rim 120-1 (hereinafter, referred to as "left reflected light" or "left reflected IR"). At least one optical signal (e.g., IR having a wavelength of 850 nm) (hereinafter, referred to as "third left reflected light" or "third left reflected IR") included in the at least two optical signals may be reflected from the front object (e.g., the hand of the user) and transmitted through the reflective surface of the left lens unit 140-1 and received by the left light receiver 113-1. At least one optical signal (e.g., IR having a wavelength of 940 nm) (hereinafter, referred to as "fourth left reflected light" or "fourth left reflected IR") included in the at least two optical signals may be reflected from the left eye 200-1 of the user, and then may not pass through the reflective surface of the left lens unit 140-1 but may be reflected and received by the left light receiver 113-1.

According to an embodiment, a right light emitter (e.g., the right light emitter 112-2 of FIG. 1) may be provided on the right rim 120-2. The right light emitter 112-2 may include at least one third right light emitting element 112-2$c$ and at least one fourth right light emitting element 112-2$d$. The at least one third right light emitting element 112-2$c$ may be provided on an outer side (front of the right rim 120-2) near where the right rim 120-2 is connected to the right temple 111-2. The at least one fourth right light emitting element 112-2$d$ may be provided on an inner surface (rear of the right rim 120-2) near where the right rim 120-2 is connected to the bridge 130.

For example, the at least one third right light emitting element 112-2$c$ may be externally controlled to generate third right incident light (e.g., IR having a wavelength of 850 nm) (hereinafter, referred to as "third right incident light" or "third right incident IR"). The third right incident light generated by the at least one third right light emitting element 112-2c may be transferred to the front object (e.g., the hand of the user). The at least one fourth right light emitting element 112-2d may be externally controlled to generate fourth right incident light (e.g., IR having a wavelength of 940 nm) (hereinafter, referred to as "fourth right incident light" or "fourth right incident IR"). The fourth right incident light generated by the at least one fourth right light emitting element 112-2d may be transmitted to the right eye 200-2 of the user.

According to an embodiment, the right support 110-2 included in the support 110 may include a right light receiver (e.g., the right light receiver 113-2 of FIG. 1) attached to an inner surface of the right temple 111-2. The right light receiver 113-2 may be provided, e.g., near where the right temple 111-2 is connected to the right rim 120-2.

The right light receiver 113-2 may receive at least two optical signals (e.g., IR rays) having different wavelengths (e.g., 850 nm and 940 nm) from the right lens unit 140-2 attached to the right rim 120-2 (hereinafter, referred to as "right reflected light" or "right reflected IR"). At least one optical signal (e.g., IR having a wavelength of 850 nm) (hereinafter, referred to as "third right reflected light" or "third right reflected IR") included in the at least two optical signals may be reflected from the front object (e.g., the hand of the user) and transmitted through the reflective surface of the right lens unit 140-2 and received by the right light receiver 113-2. At least one optical signal (e.g., IR having a wavelength of 940 nm) (hereinafter, referred to as "fourth right reflected light" or "fourth right reflected IR") included in the at least two optical signals may be reflected from the right eye 200-2 of the user and then may not pass through the reflective surface of the right lens unit 140-2 but may be reflected and received by the right light receiver 113-2.

In the following description, 'incident light' may refer to one of 'left incident light' or 'right incident light', or may be used to collectively refer to 'left incident light' and 'right incident light'. In the following description, 'reflective light' may refer to one of 'left reflected light' or 'right reflected light', or may be used to collectively refer to 'left reflected light' and 'right reflected light'.

Figure 3B:
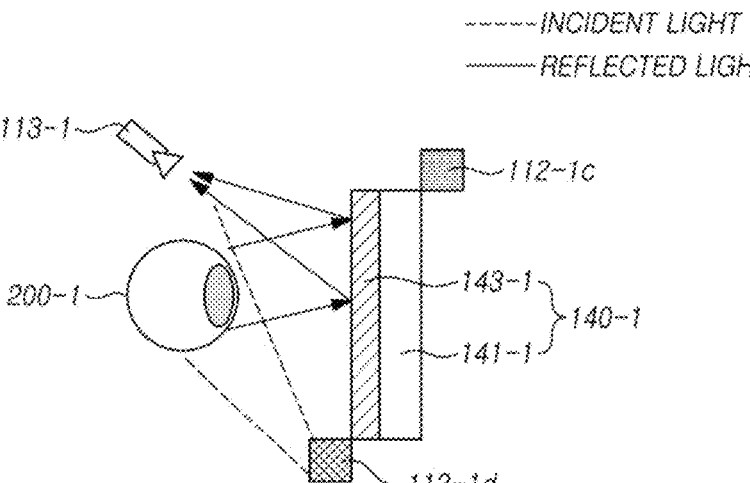
FIGS. 3B and 3C are views illustrating an example configuration of a lens unit in an AR device according to an embodiment.
Figure 3C:
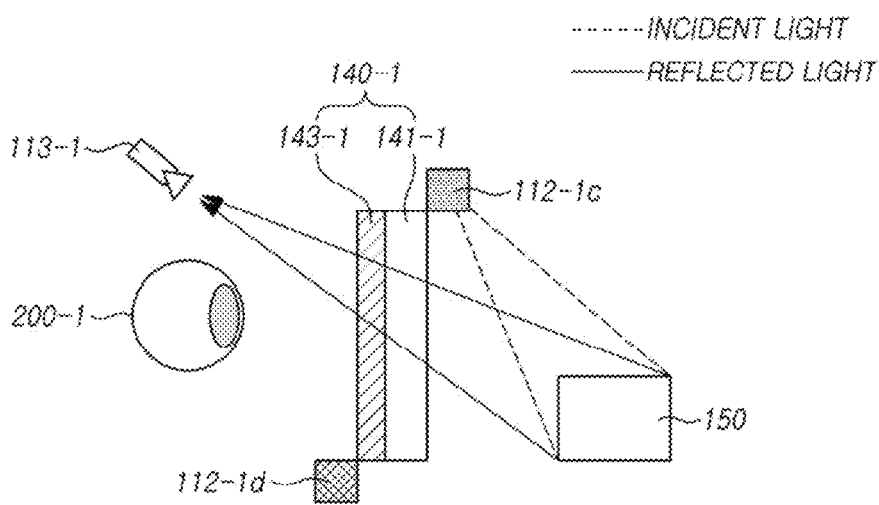

FIGS. 3B and 3C are views illustrating an example of a configuration of a lens unit (e.g., the left eye lens unit 140-1 of FIG. 3A) in an AR device (e.g., the AR device 100 of FIG. 1) according to an embodiment.

Referring to FIGS. 3B and 3C, the lens unit 140-1 may provide a reflective surface 143-1 on an inner surface of the lens 141-1. The reflective surface 143-1 may be a layer formed to have a predetermined thickness by applying a material that transmits a first wavelength (e.g., 850 nm) through an inner surface of the lens 141-1 and reflects a second wavelength (e.g., 940 nm).

According to an embodiment, the first light emitting element (e.g., the third left light emitting element 112-1c of FIG. 3A) may be externally controlled to generate third incident light (e.g., the third left incident light having a wavelength of 850 nm) (denoted by the dashed line). The first incident light generated by the first light emitting element 112-1a may be transferred to the front object 150 (e.g., the hand of the user) (see FIG. 3C).

The second light emitting element (e.g., the fourth left light emitting element 112-1d of FIG. 3A) may be externally controlled to generate second incident light (e.g., the fourth left incident light having a wavelength of 940 nm) (denoted by the dashed line). The fourth incident light generated by the second light emitting element 112-1d may be transferred to the left eye 200-1 of the user (see FIG. 3B).

According to an embodiment, the light receiver (e.g., the left light receiver 113-1 of FIG. 3A) may receive third reflected light (e.g., the third left reflected light having a wavelength of 850 nm) (denoted by the solid line) of the third incident light generated by the first light emitting element 112-1c, reflected from the front object 150 (e.g., the hand of the user) and then returned through the lens 141-1 and the reflective surface 143-1 (see FIG. 3C).

According to an embodiment, the light receiver (e.g., the left light receiver 113-1 of FIG. 3A) may receive the fourth reflected light (e.g., the fourth left reflected light having a wavelength of 940 nm) (denoted by the solid line) reflected without passing through the reflective surface 143-1 after being reflected from the left eye 200-1 (see FIG. 3B).

Figure 3D:
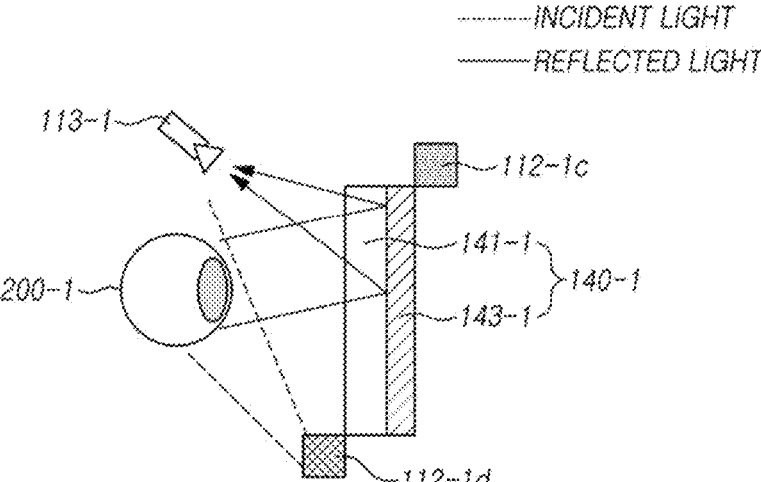
FIGS. 3D and 3E are views illustrating an example configuration of a lens unit in an AR device according to an embodiment.
Figure 3E:
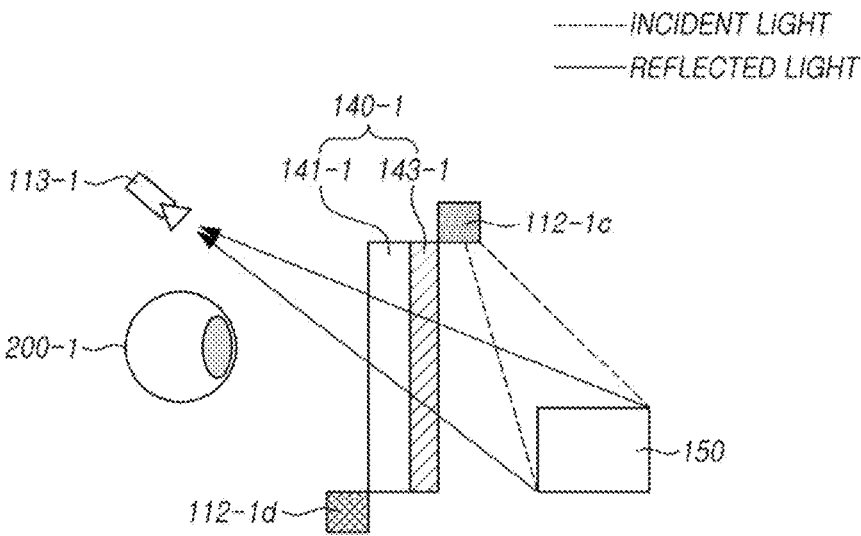

FIGS. 3D and 3E are views illustrating an example of a configuration of a lens unit (e.g., the left eye lens unit 140-1 of FIG. 1) in an AR device (e.g., the AR device 100 of FIG. 1) according to an embodiment.

Referring to FIGS. 3D and 3E, the lens unit 140-1 may provide a reflective surface 143-1 on an outer surface of the lens 141-1. The reflective surface 143-1 may be a layer formed to have a predetermined thickness by applying a material that transmits a first wavelength (e.g., 850 nm) through an outer surface of the lens 141-1 and reflects a second wavelength (e.g., 940 nm).

According to an embodiment, the first light emitting element (e.g., the third left light emitting element 112-1c of FIG. 3A) may be externally controlled to generate third incident light (e.g., the third left incident light having a wavelength of 850 nm) (denoted by the dashed line). The first incident light generated by the first light emitting element 112-1a may be transferred to the front object 150 (e.g., the hand of the user) (see FIG. 3E).

The second light emitting element (e.g., the fourth left light emitting element 112-1d of FIG. 3A) may be externally controlled to generate fourth incident light (e.g., the fourth left incident light having a wavelength of 940 nm) (denoted by the dashed line). The fourth incident light generated by the second light emitting element 112-1d may be transferred to the left eye 200-1 of the user (see FIG. 3D).

According to an embodiment, the light receiver (e.g., the left light receiver 113-1 of FIG. 3A) may receive third reflected light (e.g., the third left reflected light having a wavelength of 850 nm) (denoted by the solid line) of the third incident light generated by the first light emitting element 112-1c, reflected from the front object 150 (e.g., the hand of the user) and then returned through the reflective surface 143-1 and the lens 141-1 (see FIG. 3E).

According to an embodiment, the light receiver (e.g., the left light receiver 113-1 of FIG. 3A) may receive the fourth reflected light (e.g., the fourth left reflected light having a wavelength of 940 nm) (denoted by the solid line) transmitted through the lens 141-1 but reflected without passing through the reflective surface 143-1 after being reflected from the left eye 200-1 (see FIG. 3D).

Figure 4A:
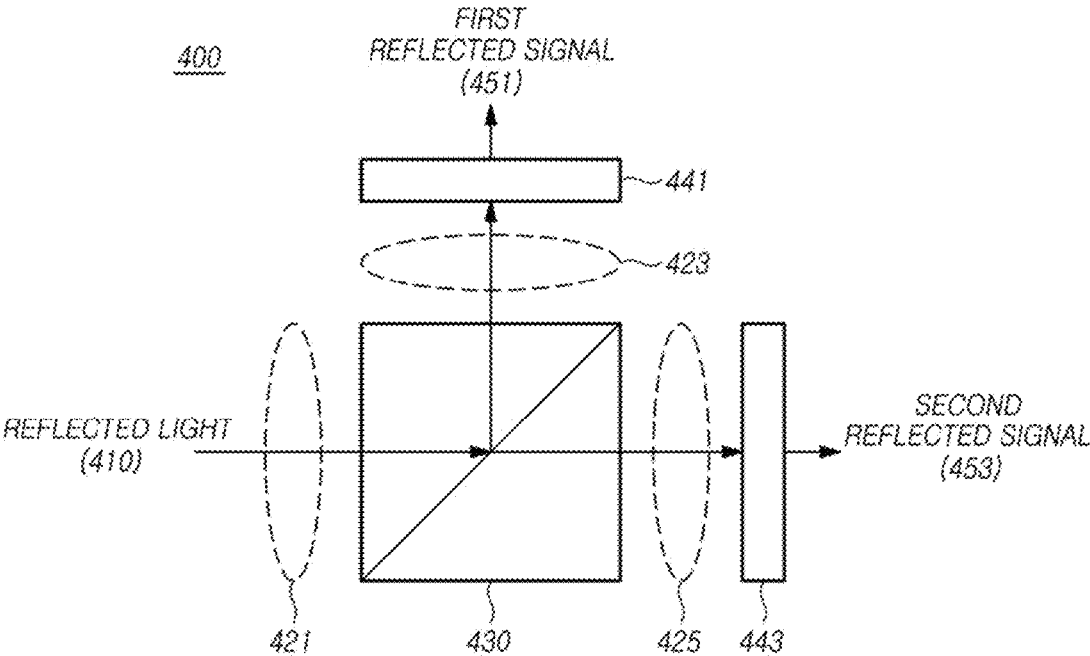
FIG. 4A is a view illustrating an example structure of splitting different wavelengths of reflected light in a light receiver constituting a sensor module of an AR device according to an embodiment.

FIG. 4A is a view illustrating an example structure of splitting different wavelengths of reflected light in a light receiver (e.g., the light receiver 113 of FIG. 2A) constituting a sensor module of an AR device (e.g., the AR device 100 of FIG. 1) according to an embodiment.

Referring to FIG. 4A, the light receiver 113 of the sensor module may include a wavelength separator 400. The wavelength separator 400 may receive the optical signal reflected from the target object and separate the received optical signal into at least two reflected waves (e.g., IR signals) having different wavelengths (e.g., 850 nm and 940 nm).

According to an embodiment, the wavelength separator 400 may include a lens group 420, a splitter 430, or a light detector 440. The lens group 420 may allow the incoming light to be refracted at a predetermined angle to be focused. The lens group 420 may include at least one lens 421, 423, and 425. The light detector 440 may convert an optical signal into an electrical signal. For example, the light detector 440 may convert photons into electrical current. The light detector 440 may include first and second photo sensors 441 and 443.

The wavelength separator 400 may separate the first reflected light (e.g., the reflected light indicated by the solid line in FIG. 2C, FIG. 2E, FIG. 3C or FIG. 3E) of the first wavelength (e.g., 850 nm) from the reflected light 410 (e.g., the reflected light indicated by the solid line in FIG. 2B, FIG. 2C, FIG. 2D, FIG. 2E, FIG. 3B, FIG. 3C, FIG. 3D or FIG. 3E) and convert the first reflected light into the first reflected signal 451, which is an electrical signal. The wavelength separator 400 may separate the second reflected light (e.g., reflected light indicated by the solid line in FIGS. 2B, FIG. 2D, FIG. 3B or FIG. 3D) of the second wavelength (e.g., 940 nm) from the reflected light 410 and convert the second reflected light into the second reflected signal 453, which is an electrical signal. The reflected light 410 may be a mixed light. For example, the mixed light may be mixed light of the optical signals which are the respective reflections of two incident light rays (e.g., the incident light denoted by the dashed line in FIG. 2B, FIG. 2C, FIG. 2D, FIG. 2E, FIG. 3B, FIG. 3C, FIG. 3D or FIG. 3E) having different wavelengths (e.g., 850 nm and 940 nm) generated by the light emitter (e.g., the light emitter 112 of FIG. 2A or 3A) of the sensor module. The target object may include the front object (e.g., the front object 150 of FIGS. 2C, FIG. 2E, FIG. 3C or FIG. 3E) or the eye of the user (e.g., the eye 200 of FIG. 2A or 3A). The front object 150 may be one hand or both hands of the user.

The splitter 430 may separate the optical signal 410 incoming through the first lens 421 into a first reflected light of the first wavelength (e.g., 850 nm) and a second reflected light of the second wavelength (e.g., 940 nm) and output them. The splitter 430 may be configured using, e.g., a reflective surface that does not transmit the first reflected light but transmits the second reflected light. The reflective surface may have a predetermined angle. The predetermined angle may determine the output path of the first reflected light separated from the optical signal 410.

The first reflected light separated by the splitter 430 may be transmitted through the second lens 423 to the first photo sensor 441. The second reflected light separated by the splitter 430 may be transmitted through the third lens 425 to the second photo sensor 443.

The first photo sensor 441 may convert the first reflected light provided through the second lens 423 into an electrical signal and output the first reflected signal 451. The first reflected signal 451 may correspond to, e.g., an optical signal reflected from the front object 150 and may be used to obtain the front object image. The front object image may be used for front object tracking (e.g., hand tracking), gesture recognition for interaction, front object recognition, and depth sensing for obtaining a stereo image. The second photo sensor 443 may convert the second reflected light provided through the third lens 425 into an electrical signal and output the second reflected signal 453. The second reflected signal 453 may correspond to, e.g., an optical signal reflected from the eye 200 of the user and may be used to obtain the eye image. The eye image may be used for gaze tracking or user authentication (e.g., iris authentication).

FIG. 4A illustrates lenses (e.g., the first, second, or third lens 421, 423, or 425, respectively) that are provided at the input terminal and two output terminals of the splitter 430. However, if necessary, only at least one or at least two of the first lens 421, the second lens 423, or the third lens 425 may be provided, or none of the lenses 421, 423, and 425 may be provided.

Figure 4B:
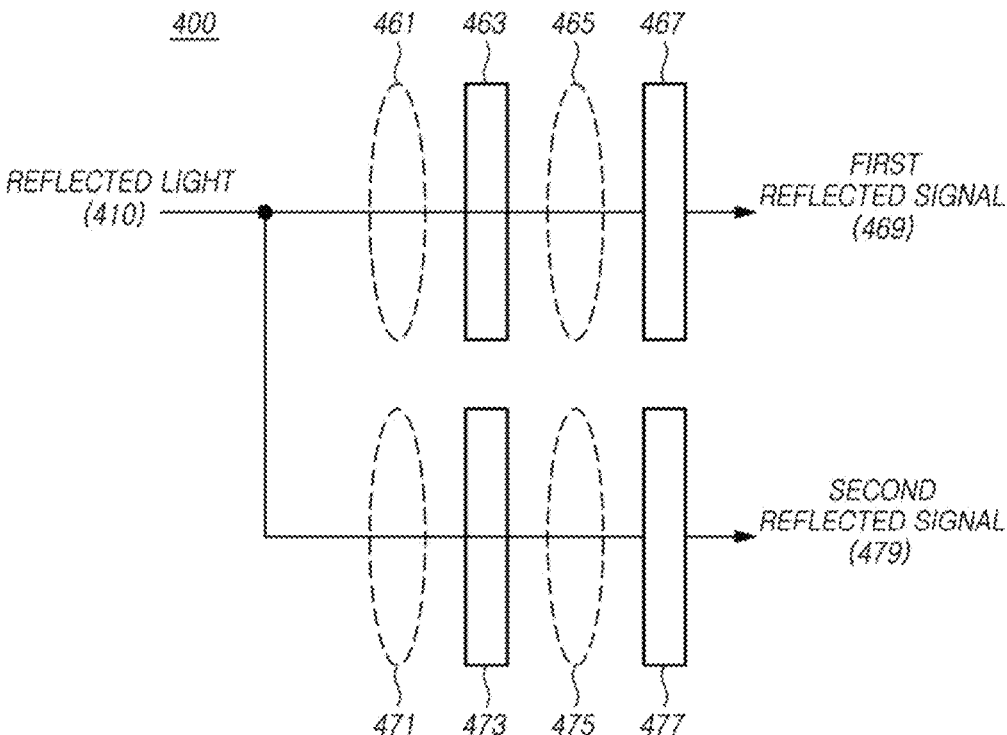
FIG. 4B is a view illustrating an example structure of splitting different wavelengths of reflected light in a light receiver constituting a sensor module of an AR device according to an embodiment.

FIG. 4B is a view illustrating an example structure of splitting different wavelengths of reflected light in a light receiver (e.g., the left light receiver 113-1 and the right light receiver 113-2 of FIG. 2A) constituting a sensor module of an AR device (e.g., the AR device 100 of FIG. 1) according to an embodiment.

Referring to FIG. 4B, the light receiver 113 of the sensor module may include a wavelength separator 400. The wavelength separator 400 may receive the optical signal reflected from the target object and separate the received optical signal into at least two reflected waves (e.g., IR signals) having different wavelengths (e.g., 850 nm and 940 nm).

According to an embodiment, the wavelength separator 400 may include lenses 461, 465, 471, and 475, filters 463 and 473, or light detectors 467 and 477. The lenses 461, 465, 471, and 475 may allow the incoming light to be refracted at a predetermined angle to be focused.

The wavelength separator 400 may separate the first reflected light (e.g., the reflected light indicated by the solid line in FIG. 2C, FIG. 2E, FIG. 3C or FIG. 3E) of the first wavelength (e.g., 850 nm) from the reflected light 410 (e.g., the reflected light indicated by the solid line in FIG. 2B, FIG. 2C, FIG. 2D, FIG. 2E, FIG. 3B, FIG. 3C, FIG. 3D or FIG. 3E) and convert the first reflected light into the first reflected signal 469, which is an electrical signal. The wavelength separator 400 may separate the second reflected light (e.g., reflected light indicated by the solid line in FIGS. 2B, FIG. 2D, FIG. 3B or FIG. 3D) of the second wavelength (e.g., 940 nm) from the reflected light 410 and convert the second reflected light into the second reflected signal 479, which is an electrical signal. The reflected light 410 may be a mixed light. For example, the mixed light may be mixed light of the optical signals which are the respective reflections of two incident light rays (e.g., the incident light denoted by the dashed line in FIG. 2B, FIG. 2C, FIG. 2D, FIG. 2E, FIG. 3B, FIG. 3C, FIG. 3D or FIG. 3E) having different wavelengths (e.g., 850 nm and 940 nm) generated by the light emitter (e.g., the light emitter 112 of FIG. 2A or 3A) of the sensor module. The target object may include the front object (e.g., the front object 150 of FIGS. 2C, FIG. 2E, FIG. 3C or FIG. 3E) or the eye of the user (e.g., the eye 200 of FIG. 2A or 3A). The front object 150 may be one hand or both hands of the user. The wavelength separator 400 may include a first extraction path or a second extraction path. The first extraction path may be a path for separating the first reflected light from the reflected light 410, converting the first reflected light into the first reflected signal 469, which is an electrical signal, and outputting the first reflected light. The second extraction path may be a path for separating the second reflected light from the reflected light 410, converting the second reflected light into the second reflected signal 479, which is an electrical signal, and outputting the second reflected light.

The lenses 461, 465, 471, and 475 may include at least one lens. For example, the lenses 461, 465, 471, and 475 may include lenses 461 and 471 for transferring an optical signal introduced into the wavelength separator 400 to the filters 463 and 473. The lenses 461, 465, 471, and 475 may include lenses 465 and 475 for transferring an optical signal output through the filters 463 and 473 to the light detectors 467 and 477.

The filters 463 and 473 may pass only an optical signal of a desired wavelength from an incoming optical signal and filter out an optical signal of a remaining wavelength. The filters 463 and 473 may include a first filter 463. The first filter 463 may pass the first reflected wave, which is the optical signal of the first wavelength (e.g., 850 nm), from the optical signal in which different wavelengths are mixed and may filter the second reflected wave, which is the optical signal of the second wavelength (e.g., 940 nm). The filters 463 and 473 may include a second filter 473. The second filter 473 may filter the first reflected wave, which is the optical signal of the first wavelength (e.g., 850 nm), from the optical signal in which different wavelengths are mixed and may pass only the second reflected wave, which is the optical signal of the second wavelength (e.g., 940 nm).

The light detectors 467 and 477 may convert an optical signal into an electrical signal. For example, the light detectors 467 and 477 may convert photons into electrical current. The light detectors 467 and 477 may include first and second photo sensors 467 and 477. The first photo sensors 467 may convert the first reflected light provided through the lens 465 into an electrical signal and output the first reflected signal 469. The first reflected signal 469 may correspond to an optical signal reflected from the front object 150 and may be used to obtain the front object image. The front object image may be used for front object tracking (e.g., hand tracking), gesture recognition for interaction, front object recognition, and depth sensing for obtaining a stereo image. The second photo sensor 477 may convert the second reflected light provided through the lens 475 into an electrical signal and output the second reflected signal 479. The second reflected signal 479 may correspond to an optical signal reflected from the eye 200 of the user and may be used to obtain the eye image. The eye image may be used for gaze tracking or user authentication (e.g., iris authentication).

FIG. 4B illustrates lenses 461, 471, 465, and 475 that are provided at the input terminal of the filters 463 and 473 and between the filters 463 and 473 and the light detectors 467 and 477. FIG. 4B illustrates that the lenses 461, 471, 465, and 475 be provided at both the input terminals of the filters 463 and 473 and between the filters 463 and 473 and the light detector 467 and 477. When necessary, only at least one or at least two of the lenses 461, 471, 465, and 475 may be provided, or none of the lenses 461, 471, 465, and 475 may be provided.

Figure 5A:
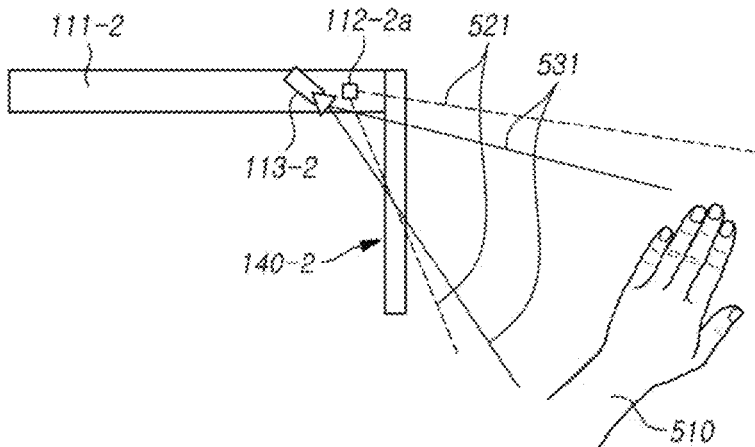
FIGS. 5A and 5B are views illustrating an example of performing hand tracking in an AR device according to an embodiment.
Figure 5B:
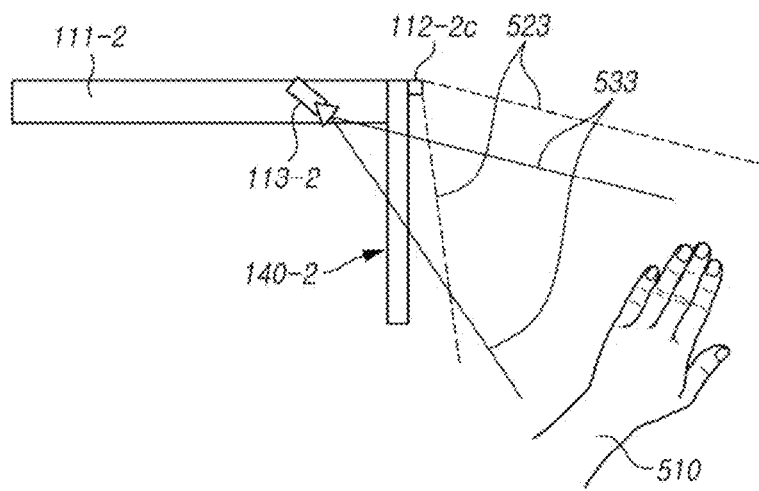

FIGS. 5A and 5B are views illustrating an example of performing hand tracking in an AR device (e.g., the AR device 100 of FIG. 1) according to an embodiment.

Referring to FIG. 5A, the AR device 100 may include a temple (e.g., the right temple 111-2 of FIG. 1) or a lens unit (e.g., the right eye lens unit 140-2). A light emitting element (e.g., the first right light emitting element 112-2a of FIG. 2A) or a light receiving element (e.g., the right light receiver 113-2 of FIG. 2A) may be provided on an inner surface of the temple 111-2 near where the lens unit 140-2 is connected/attached to the temple 111-2.

The light emitting element 112-2a may be positioned to output the incident light 521 (denoted by the dashed line) toward the lens unit 140-2. The incident light 521 may be an IR signal having a wavelength (e.g., 850 nm) capable of passing through the reflective surface (e.g., the reflective surface 143-1 of FIG. 2C or 2E) of the lens unit 140-2.

The light receiving element 113-2 may be positioned in a direction in which it is easy to receive the reflected light 531 (denoted by the solid line) that has passed through the lens unit 140-2. The reflected light 531 may be an optical signal of the incident light 521 output by the light emitting element 112-2a, reflected from the front object 510 (e.g., a hand). The reflected light 531 may be an IR signal having a wavelength (e.g., 850 nm) capable of passing through the reflective surface (e.g., the reflective surface 143-1 of FIG. 2C or 2E) of the lens unit 140-2. The light receiving element 113-2 may convert the reflected light 531 into an electrical signal and output the electrical signal.

Referring to FIG. 5B, the AR device 100 may include a temple (e.g., the right temple 111-2 of FIG. 1) or a lens unit (e.g., the right eye lens unit 140-2). A light emitting element (e.g., the first right light emitting element 112-2c of FIG. 3A) may be provided in the lens unit 140-2 to face forward near where it is connected with the temple 111-2. A light receiving element (e.g., the right light receiver 113-2 of FIG. 3A) may be provided on an inner surface near where the temple 111-2 is connected with the lens unit 140-2.

The light emitting device 112-2c may be positioned to output the incident light 523 (denoted by the dashed line) toward the front object 510 (e.g., a hand). The light receiving element 113-2 may be positioned in a direction in which it is easy to receive the reflected light 533 (denoted by the solid line) that has passed through the lens unit 140-2. The reflected light 533 may be an optical signal of the incident light 523 output by the light emitting element 112-2c, reflected from the front object 510 (e.g., a hand). The incident light 523 or reflected light 533 may be an IR signal having a wavelength (e.g., 850 nm) capable of passing through the reflective surface (e.g., the reflective surface 143-1 of FIG. 3B, 3C, 3D or 3E) of the lens unit 140-2. The light receiving element 113-2 may convert the reflected light 533 into an electrical signal and output the electrical signal.

According to an embodiment, the processor included in the AR device 100 may obtain the front object image using an electrical signal converted by the light receiving element 113-2. The processor may transfer the obtained front object image to the display module (e.g., the right display module 117-2 of FIG. 1) to be outputted through the waveguide included in the lens unit 140-2. The waveguide may be provided only in a partial area of the lens unit 140-2. For example, the waveguide may be positioned on a front surface or a rear surface of a lens (e.g., the lens 141-1 of FIG. 2B, 2C, 2D, 2E, 3B, 3C, 3D, or 3E) constituting the lens unit 140-2. For example, the waveguide may be positioned between a lens (e.g., the lens 141-1 of FIG. 2B, 2C, 2D, 2E, 3B, 3C, 3D, or 3E) constituting the lens unit 140-2 and a reflective surface (e.g., the reflective surface 143-1 of FIG. 2B, 2C, 2D, 2E, 3B, 3C, 3D, or 3E).

Figure 5C:
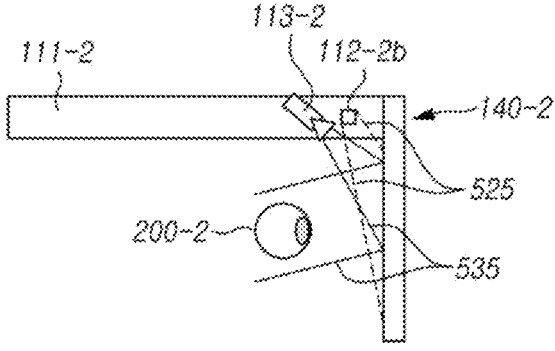
FIGS. 5C and 5D are views illustrating an example of performing gaze tracking in an AR device according to an embodiment.
Figure 5D:
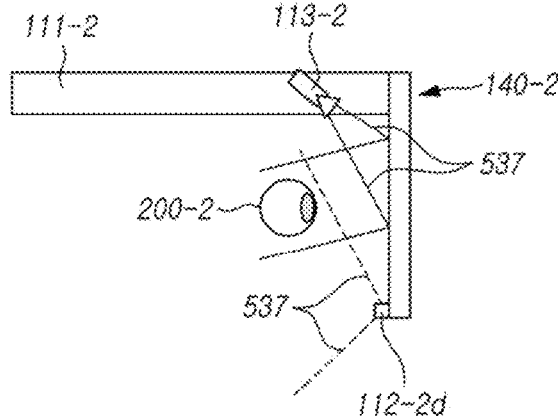

FIGS. 5C and 5D are views illustrating an example of performing gaze tracking in an AR device (e.g., the AR device 100 of FIG. 1) according to an embodiment.

Referring to FIG. 5C, the AR device 100 may include a temple (e.g., the right temple 111-2 of FIG. 1) or a lens unit (e.g., the right eye lens unit 140-2). A light emitting element (e.g., the second right light emitting element 112-2b of FIG. 2A) or a light receiving element (e.g., the right light receiver 113-2 of FIG. 2A) may be provided on an inner surface of near where the temple 111-2 is connected with the lens unit 140-2.

The light emitting element 112-2b may be positioned to output the incident light 525 (denoted by the dashed line) toward the lens unit 140-2. The incident light 525 may be an IR signal having a wavelength (e.g., 940 nm) that does not pass through the reflective surface (e.g., the reflective surface 143-1 of FIG. 2B, 2C, 2D or 2E) of the lens unit 140-2 but is reflected.

The light receiving element 113-2 may be positioned in a direction in which it is easy to receive the reflected light 535 (denoted by the solid line) reflected by the reflective surface 143-1 of the lens unit 140-2. The reflected light 535 may be an optical signal in which the reflected light reflected from the eye 220-2 is reflected by the reflective surface 143-1 and returns to the light receiving element 113-2. The incident light 525 generated by the light emitting element 112-2b may not pass through the reflective surface 143-1 but may be reflected to the eye 220-2. The reflected light 535 may be an IR signal having a wavelength (e.g., 940 nm) that does not pass through the reflective surface (e.g., the reflective surface 143-1 of FIG. 2B or 2C) of the lens unit 140-2 but is reflected. The light receiving element 113-2 may convert the reflected light 535 into an electrical signal and output the electrical signal.

Referring to FIG. 5D, the AR device 100 may include a temple (e.g., the right temple 111-2 of FIG. 1) or a lens unit (e.g., the right eye lens unit 140-2). A light emitting element (e.g., the second right light emitting element 112-2d of FIG. 3A) may be provided in the lens unit 140-2 to face the eye 200-2 of the user near the bottom. A light receiving element (e.g., the right light receiver 113-2 of FIG. 3A) may be provided on an inner surface of the temple 111-2 near where it is connected with the lens unit 140-2.

The light emitting element 112-2d may be positioned to output incident light 527 (denoted by the dashed line) toward the eye 200-2 of the user. The light receiving element 113-2 may be positioned in a direction in which it is easy to receive the reflected light 537 (denoted by the solid line) reflected by the eye 200-2. The reflected light 537 may be an optical signal in which incident light 527 output by the light emitting element 112-2d is reflected from the eye 220-2. The incident light 527 may be reflected by the reflective surface (e.g., the reflective surface 143-1 of FIGS. 3B, 3C, 3D, and 3E) of the lens unit 140-2 and transferred to the eye 220-2. The reflected light reflected from the eye 220-2 may be reflected by the reflective surface (e.g., the reflective surface 143-1 of FIGS. 3B, 3C, 3D, and 3E) and transferred to the light receiving element 113-2. The reflected light 537 may be an IR signal having a wavelength (e.g., 940 nm) that does not pass through the reflective surface (e.g., the reflective surface 143-1 of FIGS. 3B, 3C, 3D, and 3E) but is reflected. The light receiving element 113-2 may convert the reflected light 537 into an electrical signal and output the electrical signal.

According to an embodiment, the processor included in the AR device 100 may obtain the front object image using an electrical signal converted by the light receiving element 113-2. The processor may transfer the obtained front object image to the display module (e.g., the right display module 117-2 of FIG. 1) outputted through the waveguide included in the lens unit 140-2. The waveguide may be provided only in a partial area of the lens unit 140-2. For example, the waveguide may be positioned on a front surface or a rear surface of a lens (e.g., the lens 141-1 of FIG. 2B, 2C, 2D, 2E, 3B, 3C, 3D, or 3E) constituting the lens unit 140-2. For example, the waveguide may be positioned between a lens (e.g., the lens 141-1 of FIG. 2B, 2C, 2D, 2E, 3B, 3C, 3D, or 3E) constituting the lens unit 140-2 and a reflective surface (e.g., the reflective surface 143-1 of FIG. 2B, 2C, 2D, 2E, 3B, 3C, 3D, or 3E).

Figure 5E:
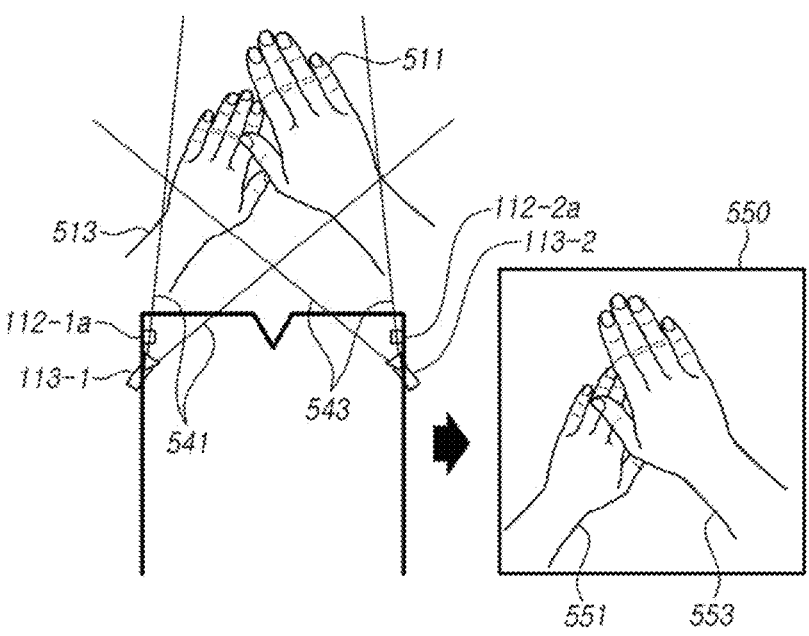
FIGS. 5E and 5F are views illustrating an example of detecting a depth to obtain a stereo image in an AR device according to an embodiment.
Figure 5F:
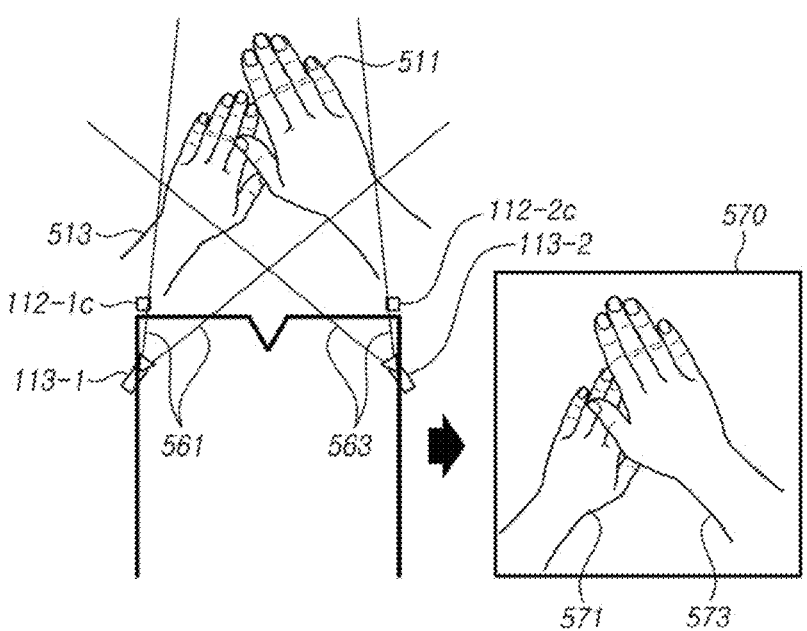

FIGS. 5E and 5F are views illustrating an example of detecting a depth to obtain a stereo image in an AR device (e.g., the AR device 100 of FIG. 1) according to an embodiment.

Referring to FIG. 5E, the AR device 100 may include left/right temples (e.g., the left/right temples 111-1 and 111-2 of FIG. 1) or left/right lens units (e.g., the left/right lens units 140-1 and 140-2).

The left temple 111-1 may include a left sensor module. The left sensor module may include a light emitting element (e.g., the first left light emitting element 112-1a of FIG. 2A) or a light receiving element (e.g., the left light receiver 113-1 of FIG. 2A). The left sensor module may be provided on an inner surface of the left temple 111-1 near where it is connected with the left lens unit 140-1.

The right temple 111-2 may include a right sensor module. The right sensor module may include a light emitting element (e.g., the first right light emitting element 112-2a of FIG. 2A) or a light receiving element (e.g., the right light receiver 113-2 of FIG. 2A). The right sensor module may be provided on an inner surface of the right temple 111-2 near where it is connected with the right lens unit 140-2.

The light emitting elements 112-1a and 112-2a may be positioned to output incident light toward the lens units 140-1 and 140-2. The incident light may be an IR signal having a wavelength (e.g., 850 nm) capable of passing through the reflective surface (e.g., the reflective surface 143-1 of FIG. 2B, 2C, 2D, or 2E) of the lens units 140-1 and 140-2.

The light receiving elements 113-1 and 113-2 may be positioned in a direction in which it is easy to receive reflected light 541 and 543 (denoted by the solid line) introduced through the lens units 140-1 and 140-2. The reflected light 541 and 543 may be an optical signal in which incident light output by the light emitting elements 112-1a and 112-2a is reflected from the front objects 511 and 513 (e.g., both hands) and returned. The two hands may have a distance difference forward/backward. The reflected light 541 and 543 may be an IR signal having a wavelength (e.g., 850 nm) capable of passing through the reflective surface (e.g., the reflective surface 143-1 of FIG. 2B, 2C, 2D, or 2E) of the lens units 140-1 and 140-2. The light receiving elements 113-1 and 113-2 may convert the reflected light 541 and 543 into an electrical signal and output the electrical signal.

Referring to FIG. 5F, the AR device 100 may include left/right temples (e.g., the left/right temples 111-1 and 111-2 of FIG. 1) or left/right lens units (e.g., the left/right lens units 140-1 and 140-2).

A light emitting element (e.g., the first left light emitting element 112-1c of FIG. 3A) may be provided in the left lens unit 140-1 to face forward near where it is connected with the left temple 111-1. A light receiving element (e.g., the left light receiver 113-1 of FIG. 3A) may be provided on an inner surface near where the left temple 111-1 is connected with the left lens unit 140-1.

A light emitting element (e.g., the first right light emitting element 112-2c of FIG. 3A) may be provided in the right lens unit 140-2 to face forward near where it is connected with the right temple 111-2. A light receiving element (e.g., the right light receiver 113-2 of FIG. 3A) may be provided on an inner surface of the right temple 111-2 near where it is connected with the right lens unit 140-2.

The light emitting elements 112-1c and 112-2c may be positioned to output incident light toward the front objects 511 and 513 (e.g., both hands). The light receiving elements 113-1 and 113-2 may be positioned in a direction in which it is easy to receive reflected light 541 and 543 (denoted by the solid line) introduced through the lens units 140-1 and 140-2. The reflected light 541 and 543 may be an optical signal in which incident light output by the light emitting elements 112-1c and 112-2c is reflected from the front objects 511 and 513 (e.g., both hands) and returned. The two hands may have a distance difference forward/backward. The reflected light 541 and 543 may be an IR signal having a wavelength (e.g., 850 nm) capable of passing through the reflective surface (e.g., the reflective surface 143-1 of FIG. 2B, 2C, 2D, or 2E) of the lens units 140-1 and 140-2. The light receiving elements 113-1 and 113-2 may convert the reflected light into an electrical signal and output the electrical signal.

According to an embodiment, the processor included in the AR device 100 may obtain depth information about the left hand using the left eye electrical signal converted by the left light receiving element 113-1. The processor may obtain depth information about the right hand using the right eye electrical signal converted by the right light receiving element 113-2. The processor may generate the front object image as a stereo image using the obtained depth information. The processor may transfer the generated stereo image to the display module (e.g., the right display module 117-2 of FIG. 1) outputted the waveguide included in the lens unit 140-2. The waveguide may be provided only in a partial area of the lens unit 140-2. For example, the waveguide may be positioned on a front surface of a lens (e.g., the lens 141-1 of FIG. 2B, 2C, 2D, 2E, 3B, 3C, 3D, or 3E) constituting the lens unit 140-2. For example, the waveguide may be positioned on a rear surface of a lens (e.g., the lens 141-1 of FIG. 2B, 2C, 2D, 2E, 3B, 3C, 3D, or 3E) constituting the lens unit 140-2. For example, the waveguide may be positioned between a lens (e.g., the lens 141-1 of FIG. 2B, 2C, 2D, 2E, 3B, 3C, 3D, or 3E) constituting the lens unit 140-2 and a reflective surface (e.g., the reflective surface 143-1 of FIG. 2B, 2C, 2D, 2E, 3B, 3C, 3D, or 3E).

Figure 6:
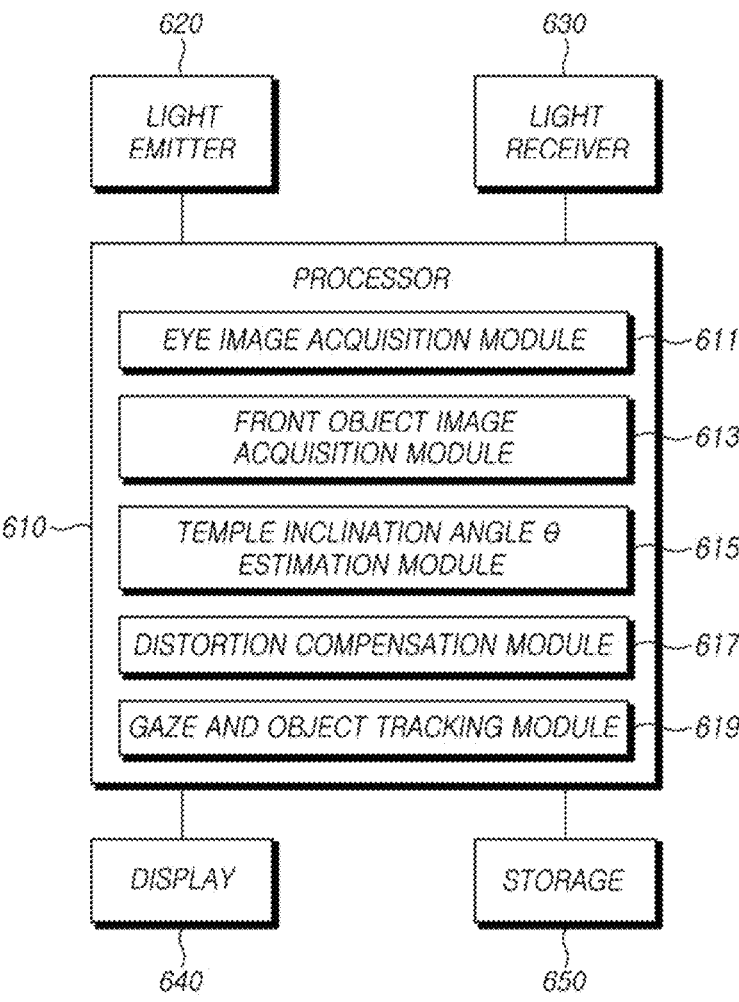
FIG. 6 is a block diagram illustrating an AR device according to an embodiment.

FIG. 6 is a block diagram illustrating an AR device (e.g., the AR device 100 of FIG. 1) according to an embodiment.

Referring to FIG. 6, as an example, the AR device 100 may include a processor 610, a light emitter 620 (e.g., the left light emitter 112-1 and the right light emitter 112-2 of FIG. 1), a light receiver 630 (e.g., the left light receiver 113-1 and the right light receiver 113-2 of FIG. 1), a display 640, or a storage 650.

The light emitter 620 may generate a first IR signal having a first wavelength based on a command of the processor 610. The light emitter 620 may generate a first IR signal having a first wavelength (e.g., 940 nm) in response to a command of the processor 610. The first IR signal may be directly transferred to the eye of the user (e.g., the eye 200 of FIG. 2A or 3A). For example, when a direction in which the first IR signal outputted from the light emitter 620 is provided to face the eye 200, the first IR signal may be directly transferred to the eye 200. For example, when the direction in which the first IR signal outputted from the light emitter 620 is provided to face the lens unit (e.g., the lens unit 140 of FIG. 1), the first IR signal may be reflected from the reflective surface (e.g., the reflective surface 143-1 of FIG. 2B, 2C, 2D, 2E, 3B, 3C, 3D, or 3E) of the lens unit 140 and transferred to the eye 200.

The light emitter 620 may generate a second IR signal having a second wavelength based on a command of the processor 610. The light emitter 620 may generate a second IR signal having a second wavelength (e.g., 850 nm) in response to a command of the processor 610. The second IR signal may be directly transferred to the front object (e.g., the front object 150 of FIG. 2C, 2E, 3C, or 3E). For example, when the direction in which the second IR signal outputted from the light emitter 620 is provided to face the front object 150, the second IR signal may be directly transferred to the front object 150. For example, when the direction in which the second IR signal outputted from the light emitter 620 is provided to face the lens unit 140, the second IR signal may be transferred to the front object 150 through the lens 1123 (e.g., the lens 141-1 of FIG. 2B, 2C, 2D, 2E, 3B, 3C, 3D, or 3E) or the reflective surface 143-1 of the lens unit 140.

The light receiver 630 may receive the first IR reflected signal of the first IR signal reflected from the eye 200. For example, the first IR signal transferred to the eye 200 may be reflected from the eye 200. The first IR reflected signal reflected from the eye 200 may be reflected from the reflective surface 143-1 of the lens unit 140 and transferred to the light receiver 630.

The light receiver 630 may receive the second IR reflected signal of the second IR signal reflected from the front object 150. For example, the second IR signal transferred to the front object 150 may be reflected from the front object 150. The second IR reflected signal reflected from the front object 150 may pass through the reflective surface 143-1 of the lens unit 140 and may be transferred to the light receiver 630.

The light receiver 630 may extract the IR signal of the IR signal having the first wavelength (e.g., 940 nm) from the input IR signal. The light receiver 630 may extract the IR signal having the second wavelength (e.g., 850 nm) from the input IR signal. The light receiver 630 may convert the IR signal of the first wavelength (e.g., 940 nm) into an eye image signal that is an electrical signal and output the same. The light receiver 630 may convert the IR signal of the second wavelength (e.g., 850 nm) into a front object image signal that is an electrical signal and output the front object image signal.

The display 640 displays and outputs information processed by the AR device 100. For example, the display 640 may display the user interface for photographing the surroundings of the AR device 100 and information related to a service provided based on the photographed image of the surroundings of the AR device 100.

For example, the display 640 may provide an AR image. The display 640 may include a waveguide provided in a partial area or an entire area of the lens unit (e.g., the lens unit 140 of FIG. 1). The display 640 may include an optical engine (e.g., the left display module 117-1 or the right display module 117-2 of FIG. 1) (hereinafter, referred to as the "display module 117"). The waveguide may be formed of a transparent material in which a partial area of the rear surface is visible when the user wears the AR device 100. The waveguide may be formed of a single-layered or multi-layered flat plate formed of a transparent material in which light may propagate while being reflected inside. The waveguide may face the light exit surface of the display module 117 and receive light of a virtual image projected from the display module 117. Here, the transparent material may mean a material through which light may pass. The transparency of the transparent material may not be 100%. The transparent material may have a predetermined color. As the waveguide is formed of a transparent material, the user may view the virtual object of the virtual image through the display 640. Further, the user may view an external actual scene through the waveguide. Accordingly, the waveguide may be referred to as a see-through display. The display 640 may provide an AR image by outputting the virtual object of the virtual image through the waveguide. When the AR device 100 is a glasses-type device, the display 640 may include a left display and a right display.

The storage 650 may store a program to be executed by the processor 610 to be described below. The storage 650 may store data input to the AR device 100 or output from the AR device 100.

The storage 650 may include at least one of an internal memory (not shown) and an external memory (not shown).

The internal memory may include at least one of, e.g., a volatile memory (e.g., a dynamic RAM (DRAM), a static RAM (SRAM), a synchronized dynamic RAM (SDRAM), etc.), a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, etc.), a hard disk drive (HDD), or a solid state drive (SSD). For example, the processor 610 may load and process commands or data received from at least one of a non-volatile memory or another component, on the volatile memory. The processor 610 may preserve data received or generated from other components in a non-volatile memory.

The external memory may include at least one of, e.g., compact flash (CF), secure digital (SD), micro secure digital (micro-SD), mini secure digital (mini-SD), extreme digital (xD), and Memory stick.

For example, the programs stored in the storage 650 may be classified into a plurality of modules to be performed by the processor 610 according to their functions. The plurality of modules may include an eye image acquisition module 611, a front object image acquisition module 613, a temple inclination angle θ estimation module 615, a distortion compensation module 617, or a gaze and object tracking module 619.

The processor 610 controls the overall operation of the AR device 100. For example, the processor 610 may perform the overall control on the display 640 or the storage 650 by executing programs stored in the storage 650.

The processor 610 may perform multi-modal interaction with the user by executing the eye image acquisition module 611, the front object image acquisition module 613, the temple inclination angle θ estimation module 615, the distortion compensation module 617, or the gaze and object tracking module 619, based on the programs stored in the storage 650.

The AR device 100 may include a plurality of processors 610. The plurality of processors 610 may execute the eye image acquisition module 611, the front object image acquisition module 613, the temple inclination angle θ estimation module 615, the distortion compensation module 617, and/or the gaze and object tracking module 619.

According to an embodiment, the processor 610 may obtain the eye image using the first IR signal having the first wavelength (e.g., 940 nm) by executing the eye image acquisition module 611.

According to an embodiment, the eye image acquisition module 611 may perform an operation of generating a first IR signal having a first wavelength (e.g., 940 nm) from the light emitter 620. For example, when a direction in which the first IR signal outputted from the light emitter 620 is provided to face the eye 200, the first IR signal may be directly transferred to the eye 200. For example, when the direction in which the first IR signal outputted from the light emitter 620 is provided to face the lens unit (e.g., the lens unit 140 of FIG. 1), the first IR signal may be reflected from the reflective surface (e.g., the reflective surface 143-1 of FIG. 2B, 2C, 2D, 2E, 3B, 3C, 3D, or 3E) of the lens unit 140 and transferred to the eye 200.

The eye image acquisition module 611 may receive the first IR reflected signal of the first IR signal reflected from the eye 200 through the light receiver 630. For example, the first IR signal transferred to the eye 200 may be directly reflected from the eye 200 and transferred through the light receiver 630. The first IR signal may be reflected from the eye 200 and then reflected from the reflective surface 143-1 of the lens unit 140 and transferred through the light receiver 630. The eye image acquisition module 611 may obtain an eye image using an electrical signal obtained by converting the first IR reflected signal received through the light receiver 630.

According to an embodiment, the processor 610 may obtain the front object image using the second IR signal having the second wavelength (e.g., 850 nm) by executing the front object image acquisition module 613.

According to an embodiment, the front object image acquisition module 613 may perform an operation of generating a second IR signal having a second wavelength (e.g., 850 nm) from the light emitter 620. For example, when the direction in which the second IR signal outputted from the light emitter 620 is provided to face the front object 150, the second IR signal may be directly transferred to the front object 150. For example, when the direction in which the second IR signal outputted from the light emitter 620 is provided to face the lens unit 140, the second IR signal may be transferred to the front object 150 through the lens 1123 (e.g., the lens 141-1 of FIG. 2B, 2C, 2D, 2E, 3B, 3C, 3D, or 3E) or the reflective surface 143-1 of the lens unit 140.

The front object image acquisition module 613 may receive the second IR reflected signal of the second IR signal reflected from the front object 150 through the light receiver 630. For example, the second IR signal transferred to the front object 150 may be directly reflected from the front object 150 and transferred through the light receiver 630. The first IR signal may be reflected from the front object 150 and then reflected from the reflective surface 143-2 of the lens unit 140 and transferred through the light receiver 630. The front object image acquisition module 613 may obtain a front object image using an electrical signal obtained by converting the second IR reflected signal received through the light receiver 630.

Figure 8A:
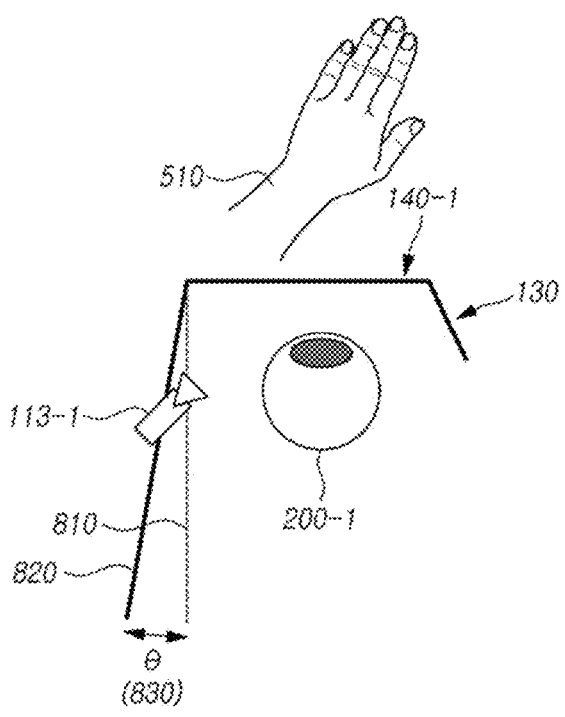
FIG. 8A is a view illustrating an example in which a temple of an AR device is twisted or contorted from wear according to an embodiment.

According to an embodiment, the processor 610 may estimate the temple inclination angle θ (e.g., the temple inclination angle (θ) 830 of FIG. 8A) by executing the temple inclination angle θ estimation module 615. The temple inclination angle (θ) 830 may be used to correct the position of the eye image or the front object image that may occur due to deformation or distortion of the temple (e.g., the temple 111 of FIG. 1). The temple inclination angle (θ) 830 may define an angle (e.g., the temple inclination angle (θ) 830 of FIG. 8A) at which the temple 111 is widened outward (a direction away from the face of the user) as compared to before wearing the temple 111 (e.g., the initial state 810 of FIG. 8A) as the user wears the AR device (e.g., the AR device 100 of FIG. 1). The temple inclination angle θ may differ on the left/right side. Accordingly, the temple inclination angle θ estimation module 615 may estimate each of the left temple inclination angle θ1 for the left temple 111-1 and the right temple inclination angle θ2 for the right temple 111-2. In the following description, the left temple inclination angle θ1 and the right temple inclination angle θ2 are collectively referred to below as the temple inclination angle θ. However, what is proposed in relation to the temple inclination angle θ below may be equally applied to the left temple inclination angle θ1 and the right temple inclination angle θ2.

According to an embodiment, the temple inclination angle θ estimation module 615 may detect a marker image. As an example, the marker (e.g., the marker 920 of FIG. 9) may be provided in a partial area (e.g., near the top left) of the reflective surface (e.g., the reflective surface 143-1 of FIG. 2B, 2C, 2D, 2E, 3B, 3C, 3D, or 3E) of the lens unit (e.g., the lens unit 140 of FIG. 1). The marker 920 may include an area (e.g., the reflective coating area 921 of FIG. 9) where reflective coating is performed with a predetermined pattern and an area (e.g., the non-reflective coating area 923 of FIG. 9) in which reflective coating is not performed. The remaining area except for the marker 920 on the reflective surface may correspond to the area (dotted area) where reflective coating is formed. Further, the marker 920 may be coated with a material capable of reflecting two optical signals (e.g., IR signals) having different wavelengths (e.g., 850 nm and 940 nm) transmitted by the light emitter.

The temple inclination angle θ estimation module 615 may obtain a marker image by receiving optical signals reflected based on two optical signals having different wavelengths transmitted by the light emitter (e.g., the light emitter 112 of FIG. 1). The temple inclination angle θ estimation module 615 may obtain a marker image by receiving optical signals reflected in response to two optical signals (e.g., IR signals) having different wavelengths (e.g., 850 nm and 940 nm) transmitted by the light emitter through the light receiver (e.g., the light receiver 114 of FIG. 1).

If the marker image is detected, the temple inclination angle θ estimation module 615 may estimate the temple inclination angle θ by the degree of deformation of the marker image. The marker image may be deformed by, e.g., the temple inclination angle θ. If the temple inclination angle θ occurs in a normal range, the temple inclination angle θ estimation module 615 may obtain a marker image having a normal pattern. However, if the temple inclination angle θ is out of the normal range, the temple inclination angle θ estimation module 615 may obtain a marker image having an abnormal pattern, that is, a deformed pattern. For example, the normal range may be preset such that the degree of deformation of the marker image does not cause distortion of the eye image or the front image. The normal range may be defined by, e.g., an upper limit threshold angle for the temple inclination angle θ. The upper limit threshold angle may be defined as a maximum value or less at which the degree of distortion of the marker image will not affect gaze tracking or front object recognition even if the temple 111 is opened outward as the user wears the AR device 100. The lower limit threshold angle for the normal range may not be separately defined. The lower limit threshold angle may be, e.g., an angle formed by the temple 111 in a state in which the user does not wear the AR device 100 (e.g., the initial state 810 of FIG. 8A). For example, the lower limit threshold angle may be 0 degrees.

For example, the temple inclination angle θ estimation module 615 may previously provide a mapping table in which the temple inclination angle θ predicted by the degree of distortion of the marker image is mapped. In this case, the temple inclination angle θ estimation module 615 may predict the temple inclination angle θ from the mapping information in the mapping table based on the degree of distortion of the marker image.

For example, it may be identified that the deformation angle of the marker image is closely related to the distance shifted by the eye image or the front object image from the center. In this sense, the temple inclination angle θ estimation module 615 may predict the temple inclination angle θ by identifying the distance between the center coordinate point among the identified coordinate points (e.g., the identified coordinate points 1030a of FIG. 10A) and the feature point of the eye image or the front object image. The feature point may be, e.g., a pupil or a hand.

According to an embodiment, the processor 610 may perform position correction of the eye image or the front object image by executing the distortion compensation module 617.

According to an embodiment, if the temple inclination angle θ is estimated, the distortion compensation module 617 may determine the angle at which the temple is twisted based on the temple inclination angle θ. The distortion compensation module 617 may obtain a plurality of corrected feature points g' and p' by compensating for the angle at which the temple is twisted at the plurality of feature points g and p. The AR device 100 may apply the corrected feature points g' and p' to the error correction function f(x) to obtain the error-corrected feature point.

The distortion compensation module 617 may determine an angle at which the temple corresponding to the temple inclination angle θ is twisted. The distortion compensation module 617 may obtain a plurality of corrected feature points o' and d' by compensating for the angle at which the temple is twisted at the plurality of feature points o and d.

According to an embodiment, the processor 610 may perform gaze tracking based on the position-corrected eye image by executing the gaze and object tracking module 619. The processor 610 may perform object tracking based on the position-corrected front object image by executing the gaze and the object tracking module 619.

According to an embodiment, if the gaze and object tracking module 619 obtains the error-corrected feature point, the gaze and object tracking module 619 may identify the gaze tracking result by applying the error-corrected feature point to the eye image. The gaze and object tracking module 619 may obtain the position of the user's gaze based on the gaze tracking result.

The gaze and object tracking module 619 may perform front object tracking based on the temple inclination angle θ. The gaze and object tracking module 619 may determine, e.g., a plurality of feature points o and d included in the front object image (e.g., the hand of the user image) obtained for hand tracking. Here, o may be a feature value corresponding to an object origin. Further, d is a value indicating a left/right disparity (L/R disparity).

If the gaze and object tracking module 619 obtains the error-corrected feature point, the gaze and object tracking module 619 may identify the hand tracking result by applying the error-corrected feature point to the front object image. The gaze and object tracking module 619 may accurately track the hand of the user movement based on the hand tracking result.

Figure 7:
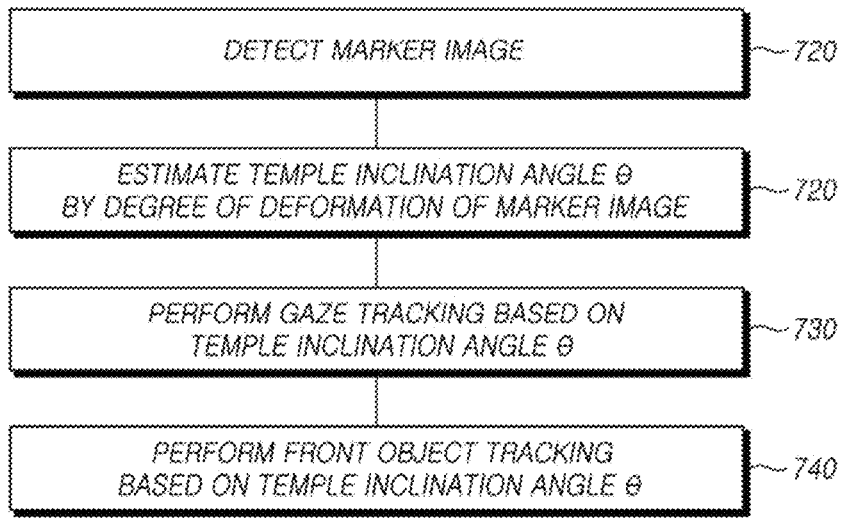
FIG. 7 is a control flowchart illustrating error correction in eye-tracking and front object recognition in an AR device according to an embodiment.

FIG. 7 is a control flowchart illustrating correction of an error in gaze tracking and front object recognition in an AR device (e.g., the AR device 100 of FIG. 1) according to an embodiment.

Referring to FIG. 7, in operation 710, the AR device 100 may detect a marker image. As an example, the marker (e.g., the marker 920 of FIG. 9) may be provided in a partial area (e.g., near the upper left end) of the reflective surface (e.g., the reflective surface 143-1 of FIG. 2B, 2C, 2D, 2E, 3B, 3C, 3D, or 3E) of the lens unit (e.g., the lens unit 140 of FIG. 1). As an example, the marker (e.g., the marker 920 of FIG. 9) may be provided in an entire area of the reflective surface (e.g., the reflective surface 143-1 of FIG. 2B, 2C, 2D, 2E, 3B, 3C, 3D, or 3E) of the lens unit (e.g., the lens unit 140 of FIG. 1). The marker 920 may include, e.g., an area (e.g., the reflective coating area 921 of FIG. 9) where reflective coating is performed with a predetermined pattern and an area (e.g., the non-reflective coating area 923 of FIG. 9) in which reflective coating is not performed. The remaining area except for the marker 920 on the reflective surface may correspond to the area (dotted area) where reflective coating is formed. Further, the marker 920 may be coated with a material capable of reflecting two optical signals (e.g., IR signals) having different wavelengths (e.g., 850 nm and 940 nm) transmitted by the light emitter.

According to an embodiment, the AR device 100 may obtain a marker image by receiving optical signals reflected based on two optical signals having different wavelengths transmitted by the light emitter through the light receiver. For example, the AR device 100 may obtain a marker image by receiving optical signals reflected in response to two optical signals (e.g., IR signals) having different wavelengths (e.g., 850 nm and 940 nm) transmitted by the light emitter (e.g., the light emitter 112 of FIG. 1) through the light receiver (e.g., the light receiver 113 of FIG. 1).

If the marker image is detected, the AR device 100 may estimate the temple inclination angle θ by the degree of deformation of the marker image in operation 720. The marker image may be deformed by the temple inclination angle θ. If the temple inclination angle θ occurs in a normal range, the AR device 100 may obtain a marker image having a normal pattern. However, if the temple inclination angle θ is out of the normal range, the AR device 100 may obtain a marker image having an abnormal pattern, that is, a deformed pattern. The normal range may be defined by an upper limit threshold angle. The upper limit threshold angle may be an angle at which the marker image is not deformed even when the temple 111 provided in the AR device 100 is open outward as the user wears the AR device 100. The upper limit threshold angle may be an angle at which deformation which does not exceed a preset threshold level occurs. The lower limit threshold angle of the normal range may not be separately defined. For example, the lower limit threshold angle may be an angle of the temple 111 in a state in which the user does not wear the AR device 100 (e.g., the initial state 810 of FIG. 8A). In the initial state 810, the angle of the temple 111 may be 0 degrees.

For example, the AR device 100 may previously provide a mapping table in which the temple inclination angle θ predicted by the degree of distortion of the marker image is mapped. In this case, the AR device 100 may predict the temple inclination angle θ from the mapping information in the mapping table based on the degree of distortion of the marker image.

For example, it may be identified that the deformation angle of the marker image is closely related to the distance shifted by the eye image or the front object image from the center. In this sense, the AR device 100 may predict the temple inclination angle θ by identifying the distance between the center coordinate point among the identified coordinate points (e.g., the identified coordinate points 1030a of FIG. 10A) and the feature point. For example, the feature point may correspond to the position of the pupil included in the eye image. For example, the feature point may correspond to the position of the hand included in the front object image.

If the temple inclination angle θ is estimated, the AR device 100 may perform gaze tracking based on the temple inclination angle θ in operation 730. For example, the AR device 100 may determine a plurality of feature points g and p included in the eye image obtained for gaze tracking. Here, g may mean the glint, and p may mean the pupil.

The AR device 100 may determine an angle at which the temple corresponding to the temple inclination angle θ is twisted. The AR device 100 may obtain a plurality of corrected feature points g' and p' by compensating for the angle at which the temple is twisted at the plurality of feature points g and p. The AR device 100 may apply the corrected feature points g' and p' to the error correction function f(x) to obtain the error-corrected feature point.

Equation 1 below generalizes an error correction function for error correction for the feature point.

$$\text{error correction function:} \begin{bmatrix} x \\ y \\ z \end{bmatrix} = F\left(R^{\Delta\theta} \cdot [\text{features}]\right) \qquad \text{[Equation 1]}$$

Here, (x, y, z) is the coordinate value of the feature point (e.g., gaze or hand), $R^{\Delta\theta}$ is the compensation matrix, and features is the feature value for gaze tracking or hand tracking.

In Equation 1, it is defined that the coordinate value of the error-corrected feature point may be obtained by executing the function using the compensation matrix and the feature value for gaze or hand tracking as the parameter.

When the AR device 100 obtains the error-corrected feature point, the AR device 100 may identify the gaze tracking result by reflecting the error-corrected feature point to the eye image. The AR device 100 may obtain the position of the user's gaze based on the gaze tracking result.

If the temple inclination angle θ is estimated, the AR device 100 may perform front object tracking based on the temple inclination angle θ in operation 740. The AR device 100 may determine a plurality of feature points o and d included in the front object image (e.g., the hand of the user image) obtained for hand tracking. Here, o may be a feature value corresponding to an object origin. Further, d is a value indicating a left/right disparity (L/R disparity).

The AR device 100 may determine an angle at which the temple corresponding to the temple inclination angle θ is twisted. The AR device 100 may obtain a plurality of corrected feature points o' and d' by compensating for the angle at which the temple is twisted at the plurality of feature points o and d. The AR device 100 may apply the corrected feature points o' and d' to the error correction function f(x) defined as Equation 1 to obtain the error-corrected feature point.

If the AR device 100 obtains the error-corrected feature point, the AR device 100 may identify the hand tracking result by applying the error-corrected feature point to the front object image. The AR device 100 may accurately track the hand of the user movement based on the hand tracking result.

FIG. 8A is a view illustrating an example in which a temple (e.g., the temple 111 of FIG. 1) is twisted as an AR device (e.g., the AR device 100 of FIG. 1) is worn according to an embodiment.

Referring to FIG. 8A, the AR device 100 may have a different size or degree/angle of opening in proportion to the head size of the user (hereinafter, referred to as a "wearer"). The AR device 100 may maintain the initial state 810 for the degree of opening between the left temple (the left temple 111-1 of FIG. 1) and the right temple (e.g., the right temple 111-2 of FIG. 1) before worn. After the AR device 100 is worn, the degree of opening between the left temple 111-1 and the right temple 111-2 may be relatively larger than that in the initial state 810 (820). Thus, in the AR device 100, the temple inclination angle (θ) 830, which is the angle between the two states, may be generated due to the difference between when the temple 111 is in the initial state 810 and when the temple 111 is in the worn state 820. The temple inclination angle (θ) 830 may affect the incident angle at which the reflected light is received by the light receiver (e.g., the left light receiver 113-1 of FIG. 1) provided on an inner surface near where the temple 111 is connected to the lens unit (e.g., the left lens unit 140-1 of FIG. 1). For example, when the temple inclination angle (θ) 830 occurs as the user wears the AR device 100, the incident angle may be relatively gentle as compared to the incident angle in the initial state 810. In other words, the incident angle in the worn state 820 may be reduced with respect to the horizontal plane, as compared with the incident angle in the initial state 810. In this case, an error may occur in the display position of the image (e.g., the front object image or the eye image) obtained by the light receiver 113-1 using the reflected light. The reflected light may be an optical signal reflected from the front object 510. The reflected light may be an optical signal reflected from the eye 200-1. The error may disturb tracking of the gaze or the movement of the front object by the AR device 100.

Figure 8B:
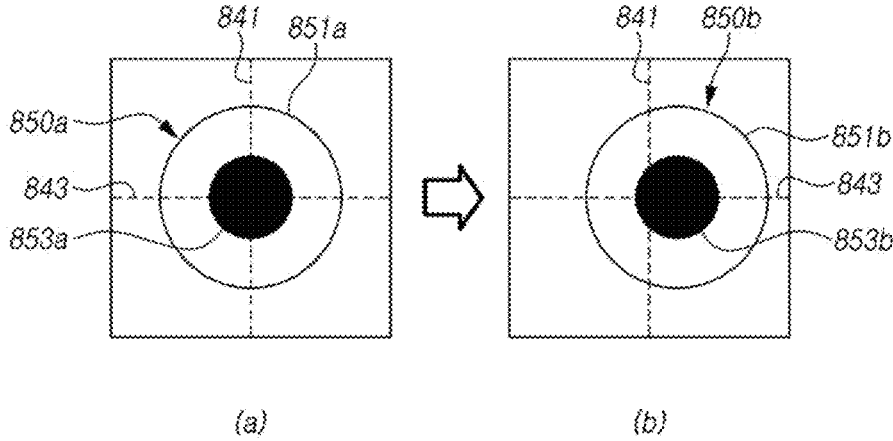
FIG. 8B is a view illustrating an example of an error occurrence to the position of an eye image due to a temple inclination angle θ in an AR device according to an embodiment.

FIG. 8B is a view illustrating an example in which an error occurs in the position of an eye image due to a temple inclination angle θ in an AR device according to an embodiment.

Referring to FIG. 8B, (a) is an eye image obtained by the AR device 100 when a temple inclination angle θ (e.g., the temple inclination angle (θ) 830 of FIG. 8A) occurs in a normal range. Here, it may be identified that the glint 851*a* and the pupil 853*a* constituting the eye 850*a* are arranged substantially with respect to the center point where the vertical center line 841 and the horizontal center line 843 meet.

(b) is an eye image obtained by the AR device 100 when the temple inclination angle (θ) 830 is out of the normal range. Here, it may be identified that the glint 851*b* and the pupil 853*b* constituting the eye 850*b* are substantially out of the center point where the vertical center line 841 and the horizontal center line 843 meet. In other words, it may be identified that the position of the eye image is overall shifted to the right by a predetermined distance. This is because the incident angle of the light receiver (e.g., the light receiver 113-1 of FIG. 8A) is changed by the temple inclination angle (θ) 830 generated as the user wears the AR device 100.

Figure 8C:
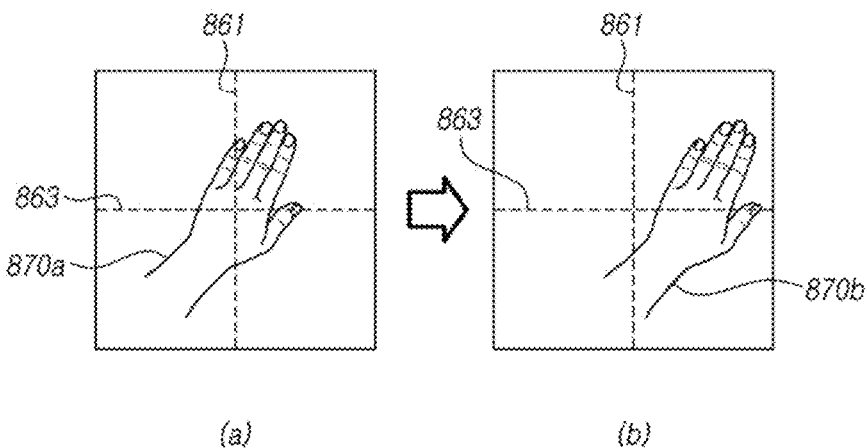
FIG. 8C is a view illustrating an example of an error occurrence to the position of a front object image due to a temple inclination angle θ in an AR device according to an embodiment.

FIG. 8C is a view illustrating an example in which an error occurs in the position of a front object image due to a temple inclination angle θ in an AR device according to an embodiment.

Referring to FIG. 8C, (a) is a front object image obtained by the AR device 100 when a temple inclination angle θ (e.g., the temple inclination angle (θ) 830 of FIG. 8A) occurs in a normal range. Here, it may be identified that the hand 870*a*, as the front object, is provided substantially with respect to the center point where the vertical center line 861 and the horizontal center line 863 meet.

(b) is a front object image obtained by the AR device 100 when the temple inclination angle (θ) 830 is out of the normal range. Here, it may be identified that the hand 870*b* corresponding to the front object is substantially out of the center point where the vertical center line 861 and the horizontal center line 863 meet. In other words, it may be identified that the position of the front object image is overall shifted to the right by a predetermined distance. This is because the incident angle of the light receiver (e.g., the light receiver 113-1 of FIG. 8A) is changed by the temple inclination angle (θ) 830 generated as the user wears the AR device 100.

As described above, due to the temple inclination angle (θ) 830 changed by the size of the head of the user wearing the AR device 100, an error may occur in position measurement during gaze tracking or front object recognition. Therefore, a method for correcting the error is required.

Figure 9:
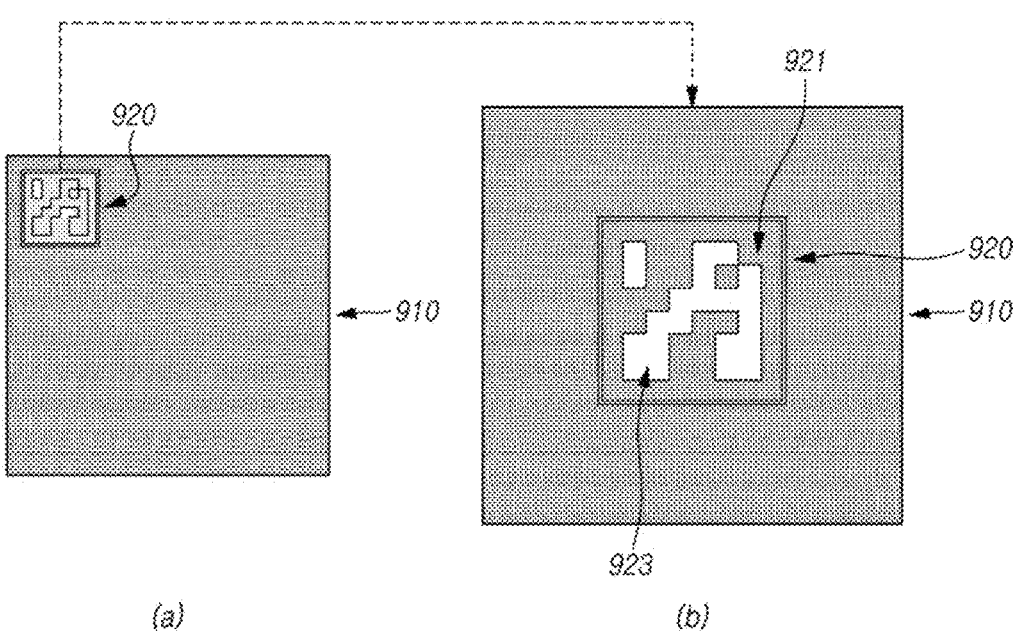
FIG. 9 is a view illustrating an example of predicting a temple inclination angle θ using a marker provided on a lens unit in an AR device according to an embodiment.

FIG. 9 is a view illustrating an example of predicting a temple inclination angle θ (e.g., the temple inclination angle (θ) 830 of FIG. 8A) using a marker provided on a lens unit (e.g., the lens unit 140 of FIG. 1) in an AR device (e.g., the AR device 100 of FIG. 1) according to an embodiment.

Referring to FIG. 9, the marker 920 may be provided in a partial area (e.g., near the top left end) of the reflective surface 910 (e.g., the reflective surface 143-1 of FIG. 2B, 2C, 3B, or 3C) of the lens unit 140. The marker 920 may include, e.g., an area 921 (e.g., the dotted area) where reflective coating is performed with a predetermined pattern and an area 923 (e.g., the white area) in which reflective coating is not performed. Further, the marker 920 may be coated with a material capable of reflecting two optical signals (e.g., IR signals) having different wavelengths (e.g., 850 nm and 940 nm) transmitted by the light emitter. The remaining area except for the marker 920 on the reflective surface 910 may correspond to the area (dotted area) where reflective coating is formed.

According to an embodiment, the AR device 100 may obtain a marker image based on reflected light received through a light receiver (e.g., the light receiver 113 of FIG. 1). The reflected light may be an optical signal reflected based on (or in response to) two optical signals (e.g., IR signals) having different wavelengths (e.g., 850 nm and 940 nm) transmitted by the light emitter (e.g., the light emitter 112 of FIG. 1). The marker image may be deformed by a temple inclination angle θ (e.g., the temple inclination angle (θ) 830 of FIG. 8A). If the temple inclination angle θ occurs in a normal range, the AR device 100 may obtain a marker image having a normal pattern. However, if the temple inclination angle θ is out of the normal range, the AR device 100 may obtain a marker image having an abnormal pattern, that is, a deformed pattern. The normal range may be defined by an upper limit threshold angle. The upper limit threshold angle may be an angle at which the marker image is not deformed even when the temple 111 provided in the AR device 100 is open outward as the user wears the AR device 100. The upper limit threshold angle may be an angle at which the deformation of the marker image is in a range that does not to exceed a preset threshold level even when the temple 111 provided in the AR device 100 is open outward as the user wears the AR device 100. The lower limit threshold angle of the normal range may not be separately defined. For example, the lower limit threshold angle may be an angle of the temple 111 in a state in which the user does not wear the AR device 100 (e.g., the initial state 810 of FIG. 8A). In the initial state 810, the angle of the temple 111 may be 0 degrees.

Figure 10A:
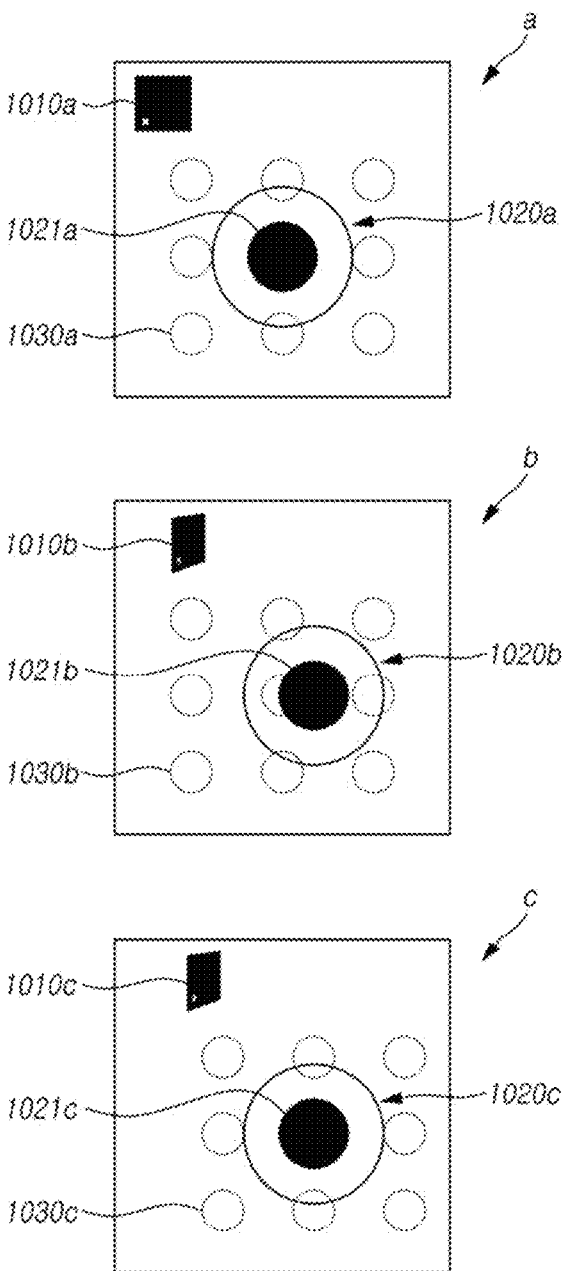
FIG. 10A is a view illustrating an example of correcting an eye image using a marker image in an AR device according to an embodiment.

FIG. 10A is a view illustrating an example of correcting an eye image using a marker image in an AR device (e.g., the AR device 110 of FIG. 1) according to an embodiment.

Referring to FIG. 10A, when the temple inclination angle θ is present in a normal range, the AR device 100 may obtain a normal marker image 1010*a* or an eye image 1020*a* provided at a normal position (see (a)). In other words, by applying a virtual gaze tracking map, it may be identified that the center of the pupil 1021*a*, which is the feature point of the eye 1020*a*, is substantially positioned at the center coordinate point among the identification coordinate points 1030*a* included in the gaze tracking map.

When the temple inclination angle θ is out of the normal range, the AR device 100 may obtain an abnormal marker image 1010*b* (see (b)). For example, it may be identified that the marker image 1010*b* is rotated counterclockwise by a predetermined angle as compared to the normal marker image 1010*a*. It may be analyzed that the temple inclination angle θ has been increased as compared with the normal state. The AR device 100 may predict the temple inclination angle θ based on the degree of rotation of the marker image 1010*b* as compared to the normal marker image 1010*a*.

For example, the AR device 100 may previously provide a mapping table in which the temple inclination angle θ predicted by the degree of distortion of the marker image is mapped. In this case, the AR device 100 may predict the temple inclination angle θ from the mapping information in the mapping table based on the degree of distortion of the marker image.

For example, the AR device 100 may provide an equation capable of generalizing the relationship between the spacing between a reference point (e.g., the center coordinate point) and a feature point that is a substantial center of the eye image 1020*b* and the temple inclination angle θ. In this case, the temple inclination angle θ may be estimated by obtaining and applying the spacing to the equation.

As may be identified from the drawings, the rotation angle of the marker image may be closely related to the distance to which the eye image 1020*b* has been shifted from the center. In this sense, the AR device 100 may predict the temple inclination angle θ by identifying the distance between the center coordinate point among the identified coordinate points 1030*a* and the feature point of the eye 1020*b* (e.g., the center of the pupil 1021*b*).

The AR device 100 may determine the degree of correction by the predicted temple inclination angle θ, and apply the determined correction information to the virtual gaze tracking map to output a gaze tracking result indicating that the eye image 1020*c*, which may be determined to be shifted to the right to face the side surface, faces the front (see c).

Figure 10B:
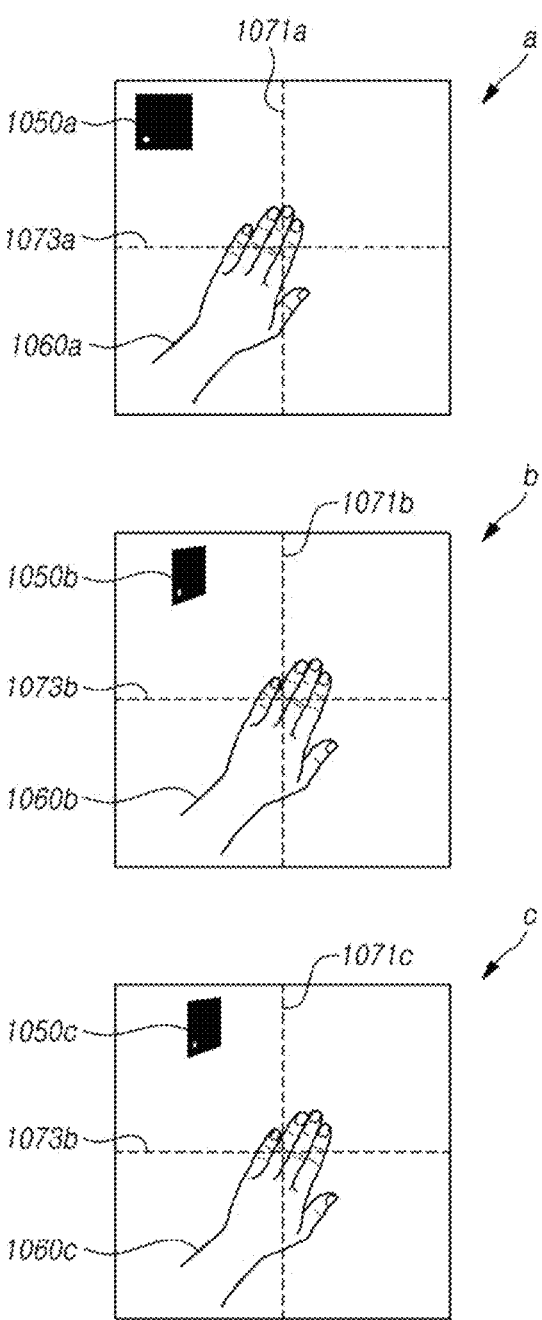
FIG. 10B is a view illustrating an example of correcting a front object image using a marker image in an AR device according to an embodiment.

FIG. 10B is a view illustrating an example of correcting a front object image (e.g., a hand) using a marker image in an AR device (e.g., the AR device 110 of FIG. 1) according to an embodiment.

Referring to FIG. 10B, when the temple inclination angle θ is present in a normal range, the AR device 100 may identify that a normal marker image 1050*a* is displayed (see (a)). Further, the AR device 100 may identify that the eye image 1020*a* is provided at a normal position. In other words, it may be identified that the front object image 1060*a* is provided with respect to the center point where the virtual vertical center line 1071*a* and the horizontal center line 1073*a* meet.

When the temple inclination angle θ is out of the normal range, the AR device 100 may obtain an abnormal marker image 1050*b* (see (b)). For example, it may be identified that the marker image 1050*b* is rotated counterclockwise by a predetermined angle as compared to the normal marker image 1050*a*. It may be analyzed that the temple inclination angle θ has been increased as compared with the normal state. The AR device 100 may predict the temple inclination angle θ based on the degree of rotation of the marker image 1050*b* as compared to the normal marker image 1050*a*. For example, the AR device 100 may previously provide a mapping table in which the temple inclination angle θ predicted by the degree of distortion of the marker image is mapped. In this case, the AR device 100 may predict the temple inclination angle θ from the mapping information in the mapping table based on the degree of distortion of the marker image. As may be identified from the drawings, the rotation angle of the marker image may be closely related to the distance to which the front object image 1060*b* has been shifted from the center. In this sense, the AR device 110 may predict the temple inclination angle θ by identifying the distance between the center point where the virtual vertical center line 1071*b* and the horizontal center line 1073*b* meet and the hand, which may be a feature point of the front object image 1060*b*.

The AR device 100 may determine the degree of correction by the predicted temple inclination angle θ, and apply the determined correction information to the center point where the virtual vertical center line 1071*c* and the horizontal center line 1073*c* meet, thereby outputting a result of tracking the position of the hand in the front object image 1060*c* which has a positional error due to a shift to the right (see (c)).

Figure 11:
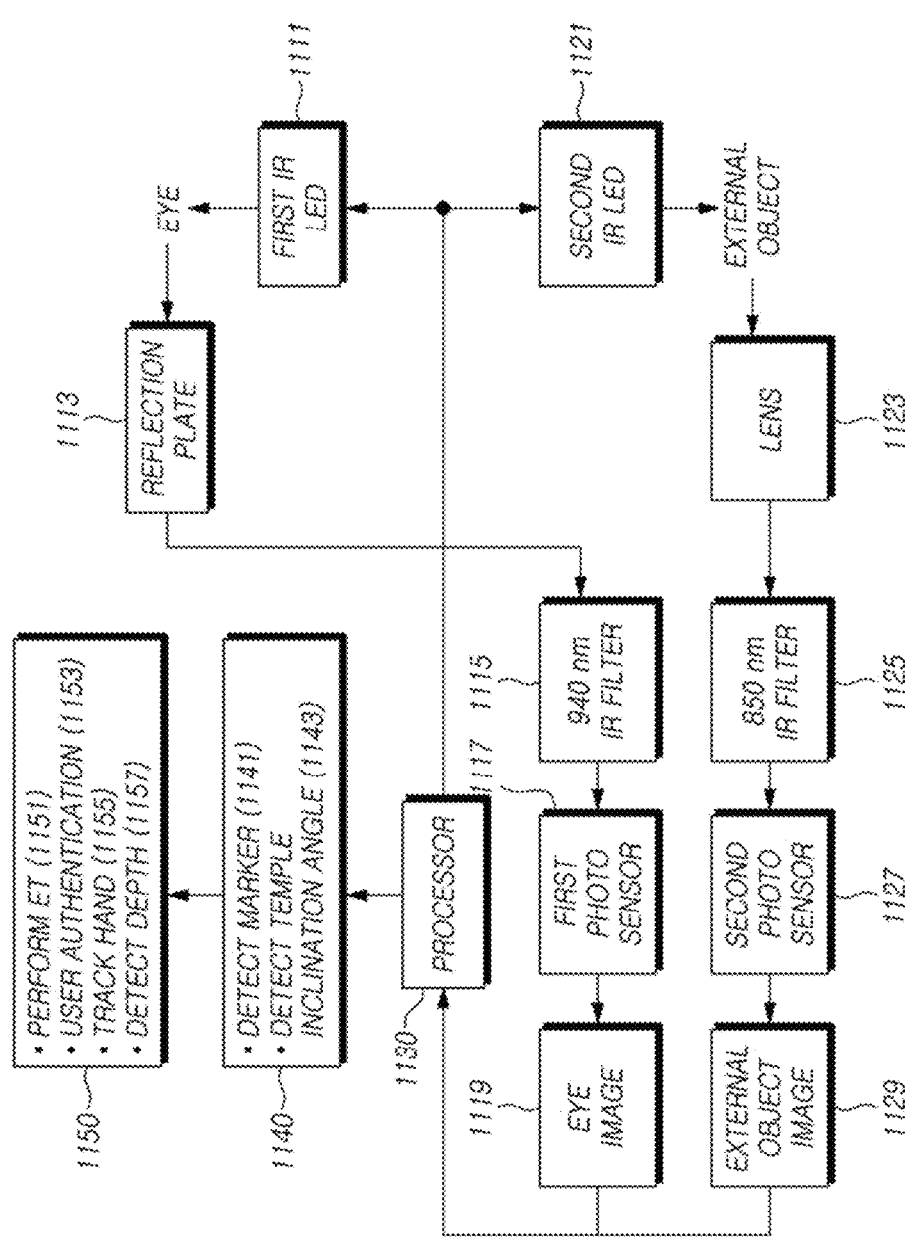
FIG. 11 is an operation flowchart illustrating a multimodal interaction in an AR device according to an embodiment.

FIG. 11 is an operation flowchart illustrating a multi-modal interaction in an AR device (e.g., the AR device 100 of FIG. 1) according to an embodiment.

Referring to FIG. 11, a processor 1130 (e.g., the processor 610 of FIG. 6) of an AR device 100 may provide a command to generate a first infrared (IR) signal and a second IR signal having different wavelengths to perform interaction.

A first IR LED 1111 (e.g., the second left light emitting element 112-1*b* or 112-1*d* of FIG. 2A or 3A) may generate a first IR signal having a first wavelength (e.g., 940 nm) based on (or in response to) the command of the processor 1130. The first IR signal may be directly transferred to the eye of the user (e.g., the eye 200 of FIG. 2A or 3A). For example, when a direction in which the first IR signal is output from the first IR LED 1111 is provided to face the eye 200, the first IR signal may be directly transferred to the eye 200. For example, when the direction in which the first IR signal is output from the first IR LED 1111 is provided to face the lens unit (e.g., the lens unit 140 of FIG. 1), the first IR signal may be reflected from the reflection plate 1113 (e.g., the reflective surface 143-1 of FIG. 2B, 2C, 2D, 2E, 3B, 3C, 3D, or 3E) of the lens unit 140 and transferred to the eye 200.

A second IR LED 1121 (e.g., the first left light emitting element 112-1*a* or 112-1*c* of FIG. 2A or 3A) may generate a second IR signal having a second wavelength (e.g., 850 nm) based on (or in response to) the command of the processor 1130. The second IR signal may be directly transferred to the front object (e.g., the front object 150 of FIG. 2B, 2C, 3B, or 3C). For example, when the direction in which the second IR signal outputted from the second IR LED 1121 is provided to face the front object 150, the second IR signal may be directly transferred to the front object 150. For example, when the direction in which the second IR signal outputted from the second IR LED 1121 is provided to face the lens unit 140, the second IR signal may be transferred to the front object 150 through the lens 1123 (e.g., the lens 141-1 of FIG. 2B, 2C, 2D, 2E, 3B, 3C, 3D, or 3E) of the lens unit 140. For example, when a direction in which the second IR signal outputted from the second IR LED 1121 is provided to face the lens unit 140, the second IR signal may be transferred to the front object 150 through the reflective surface 143-1.

The first IR signal transferred to the eye 200 may be reflected from the eye 200 and transferred to the first IR filter 1115. Hereinafter, the first IR signal reflected from the eye

200 is referred to as a 'first IR reflected signal.' For example, the first IR reflected signal reflected from the eye 200 may be reflected from the reflection plate 1113 of the lens unit 140 and transferred to the first IR filter 1115. The first IR filter 1115 may extract only an IR signal having the first wavelength (e.g., 940 nm) from the input IR signal and transfer the extracted IR signal to the first photo sensor 1117. The first IR filter 1115 and the first photo sensor 1117 may constitute one light receiving element (e.g., the left/right light receiving element 113-1 or 113-2 of FIG. 2A or 3A). The first photo sensor 1117 may convert the IR signal of the first wavelength (e.g., 940 nm) transferred from the first IR filter 1115 into an eye image signal 1119 which is an electrical signal and output the eye image signal 1119.

The second IR signal transferred to the front object 150 may be reflected from the front object 150 and transferred to the second IR filter 1125. Hereinafter, the second IR signal reflected from the electronic device object 150 is referred to as a 'second IR reflected signal.' For example, the second IR reflected signal reflected from the front object 150 may pass through the reflection plate 1113 of the lens unit 140 and may be transferred to the second IR filter 1125. For example, the second IR reflected signal reflected from the front object 150 may pass through the lens 1123 and may be transferred to the second IR filter 1125. The second IR filter 1125 may extract only the IR signal having the second wavelength (e.g., 850 nm) from the input IR signal and transfer the extracted IR signal to the second photo sensor 1127. The second IR filter 1125 and the second photo sensor 1127 may constitute one light receiving element (e.g., the left/right light receiving element 113-1 or 113-2 of FIG. 2A or 3A). The second photo sensor 1127 may convert the IR signal of the second wavelength (e.g., 850 nm) transferred from the second IR filter 1125 into a front object image signal 1129, which is an electrical signal, and may output the front object image signal 1129.

The processor 1130 may interact with the user using the eye image 1119 or the front object image 1129. For example, in order to accurately interact with the user, the processor 1130 may perform a procedure (operation 1140) for correcting an error due to the opening between temples that occurs when the user wears the AR device 100.

For example, the processor 1130 may previously provide a mapping table in which the temple inclination angle θ predicted by the degree of distortion of the marker image is mapped. To that end, the processor 1130 may detect a marker image 1141 and detect the temple inclination angle 1143 based on the degree of distortion of the detected marker image. In this case, the processor 1130 may predict the temple inclination angle θ from the mapping information in the mapping table based on the degree of distortion of the marker image.

For example, since the rotation angle of the marker image is closely related to the distance to which the front object image 1060b has been shifted from the center, the processor 1130 may predict the temple inclination angle θ by identifying the distance between the virtual center and the feature point based thereupon (1143). The feature point may be the position of the eye included in the eye image 1119. The feature point may be the position of the hand included in the front object image 1129.

The processor 1130 may perform position correction on the target image (e.g., the eye image 1119 or the front object image 1120) using the detected temple inclination angle θ. In operation 1150, the processor 1130 may perform gaze tracking 1151 using the position-corrected eye image 1119. In operation 1150, the processor 1130 may perform user authentication 1153 using the position-corrected eye image 1119. In operation 1150, the processor 1130 may perform hand tracking 1155 or depth detection 1157 using the position-corrected front object image 1129.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" or "unit" may include a component implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., the memory 940) that is readable by a machine (e.g., the electronic device 110 or 900). For example, a processor (e.g., the processor 910) of the machine (e.g., the electronic device 110 or 900) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately provided in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed:

1. An augmented reality device, comprising:
   a lens unit comprising a reflective surface configured to transmit light of a first wavelength and to reflect light of a second wavelength;
   a support configured to mount the augmented reality device on a head of a user;
   a light emitter disposed at the support, the light emitter configured to generate first light of the first wavelength and second light of the second wavelength;
   a light receiver disposed at the support, the light receiver configured to:
      obtain third light corresponding to the first light and output an object image signal based on the third light, and
      obtain fourth light corresponding to the second light and output an eye image signal based on the fourth light,
   wherein the reflective surface or a left eye lens of the lens unit is printed with a marker which transmits the second wavelength,
   wherein the third light corresponds to the first light reflected from an object positioned in front of the augmented reality device, transmitted through the reflective surface, and received at the light receiver, and
   wherein the fourth light corresponds to the second light reflected from an eye of the user and then reflected by a portion of the reflective surface excluding the marker before being received at the light receiver.

2. The augmented reality device of claim 1, wherein the light emitter comprises:
   a first light emitting element configured to generate the first light, the first light emitting element disposed at a front portion of the lens unit to allow the first light to reach the object without transmitting through the reflective surface; and
   a second light emitting element configured to generate the second light and provided to allow the second light to reach the eye of the user.

3. The augmented reality device of claim 1, wherein the light emitter comprises:
   a first light emitting element configured to generate the first light and disposed at the inner surface of the support to allow the first light to reach the object through the reflective surface; and
   a second light emitting element configured to generate the second light and disposed to allow the second light to reach the eye of the user.

4. The augmented reality device of claim 2, wherein the second light emitting element is disposed at the inner surface of the support to face the lens unit.

5. The augmented reality device of claim 1, wherein the first wavelength is different from the second wavelength.

6. The augmented reality device of claim 1, wherein the first incident light is a first infrared ray having a wavelength of 850 nm, and the second incident light is a second infrared ray having a wavelength of 940 nm.

7. The augmented reality device of claim 1, wherein the reflective surface comprises a first coating material disposed at an inner surface of a lens included in the lens unit.

8. The augmented reality device of claim 1, wherein the reflective surface comprises a first coating material disposed at an outer surface of a lens included in the lens unit.

9. The augmented reality device of claim 1, wherein the light receiver comprises:
   a lens configured to condense an incoming light;
   a splitter configured to separate light transmitted through the lens into the first reflected light and the second reflected light;
   a first photosensor configured to convert the third light into the object image signal; and
   a second photosensor configured to convert the second reflected light into the eye image signal.

10. The augmented reality device of claim 1, further comprising a processor configured to recognize the object based on the object image signal or to recognize an eye based on the eye image signal.

11. The augmented reality device of claim 10, wherein the light receiver comprises:
   a lens configured to condense an incoming light;
   a filter configured to extract only an optical signal of a specific wavelength from an optical signal condensed through the lens; and
   a light detector converting the optical signal of the specific wavelength extracted by the filter into the object image signal or the eye image signal.

12. The augmented reality device of claim 1, wherein the lens unit comprises a right eye lens and a left eye lens, and wherein the light emitter comprises:
   a first light emitting element disposed near the right eye lens and configured to generate first right eye light to be transferred to the object;
   a second light emitting element disposed near the left eye lens and configured to generate first left eye light to be transferred to the object;

a third light emitting element disposed near the right eye lens and configured to generate second right eye light to be transferred to the user's eye; and a fourth light emitting element disposed near the left eye lens and configured to generate second left eye light to be transferred to the eye of the user, and wherein the light receiver comprises:

a first light receiver disposed near the right eye lens and configured to convert first right eye reflected light, reflected by the object and transmitted through a first reflective surface provided in the right eye lens, into a first object image signal and output the first object image signal and to convert second right eye reflected light, reflected by the eye of the user and reflected by the first reflective surface, into a first eye image signal and output the first eye image signal; and a second light receiver provided near the left eye lens and configured to convert first left eye reflected light, reflected by the object and transmitted through a second reflective surface provided in the left eye lens, into a second object image signal and output the second object image signal and to convert second left eye reflected light, reflected by the eye of the user and reflected by the second reflective surface, into a second eye image signal and output the second eye image signal.

13. The augmented reality device of claim 12, further comprising a processor is configured to obtain depth information of the object based on the first object image signal and the second object image signal.

14. The augmented reality device of claim 1, wherein a pattern of the marker comprises an area configured to reflect one of the first light or the second light.

15. The augmented reality device of claim 1, further comprising a processor configured to:

obtain an inclination angle corresponding to a degree of spread of the support by analyzing a marker image signal, and correct a position of an object image obtained by the object image signal or an eye image obtained by the eye image signal based on the inclination angle.

16. The augmented reality device of claim 15, wherein the light receiver is configured to convert reflected light of the second light, reflected by the marker, into the marker image signal and output the marker image signal.

17. A method for performing a multi-modal interaction in an augmented reality device, the method comprising:

emitting first light of a first wavelength in front of the augmented reality device through a lens;

emitting second light of a second wavelength different from the first wavelength toward an eye of a user wearing the augmented reality device;

receiving reflected light comprising third light of the first wavelength reflected from an object in front of the augmented reality device, and fourth light of the second wavelength reflected from the eye;

obtaining an object image by separating the third light from the reflected light;

obtaining an eye image by separating the fourth light from the reflected light; and performing an interaction with a user based on the obtained object image or the obtained eye image;

wherein the first light and the second light are emitted towards a marker and disposed at a reflective surface of the lens, the marker being configured to allow transmission of the second reflected light, wherein the third light corresponds to the first light reflected from the object, transmitted through the reflective surface, and received at a light receiver, and wherein the fourth light corresponds to the second light reflected from the eye of the user and then reflected by a portion of the reflective surface excluding the marker before being received at the light receiver.

18. The method of claim 17, further comprising:

obtaining a marker image reflected from the marker based on the second light;

estimating a temple inclination angle based on a degree of distortion of the obtained marker image; and performing position correction on the object image or the eye image based on the estimated temple inclination angle.

19. The method of claim 17, wherein the first light is a first infrared ray having a wavelength of 850 nm, and the second light is a second infrared ray having a wavelength of 940 nm.

20. The method of claim 17, wherein the first light reaches the object transmitted through the lens, and the second light reaches the eye of the user reflected from the lens.

* * * * *